(12) United States Patent
Oka et al.

(10) Patent No.: US 6,992,673 B2
(45) Date of Patent: Jan. 31, 2006

(54) MEMORY ACCESS DEVICE, SEMICONDUCTOR DEVICE, MEMORY ACCESS METHOD, COMPUTER PROGRAM AND RECORDING MEDIUM

(75) Inventors: Masaaki Oka, Kanagawa (JP); Toshiyuki Hiroi, Saitama (JP)

(73) Assignee: Sony Computer Entertainment, Inc., Tokyo (JP)

( * ) Notice: Subject to any disclaimer, the term of this patent is extended or adjusted under 35 U.S.C. 154(b) by 324 days.

(21) Appl. No.: 10/376,983

(22) Filed: Feb. 28, 2003

(65) Prior Publication Data

US 2003/0231176 A1 Dec. 18, 2003

(30) Foreign Application Priority Data

Mar. 1, 2002 (JP) .............................. 2002-056548
Jan. 7, 2003 (JP) .............................. 2003-001595

(51) Int. Cl.
*G09G 5/39* (2006.01)

(52) U.S. Cl. ...................... 345/531; 345/540; 345/543; 345/571

(58) Field of Classification Search ................ 345/531, 345/540, 543, 545, 564, 571, 501, 566; 711/200, 711/100, 111, 154, 157, 202
See application file for complete search history.

(56) References Cited

U.S. PATENT DOCUMENTS

| 5,293,480 | A | 3/1994 | Miller et al. |
| 5,790,136 | A | 8/1998 | Hoffert et al. |
| 5,794,016 | A | 8/1998 | Kelleher |
| 6,172,670 | B1 * | 1/2001 | Oka et al. .................... 711/200 |

FOREIGN PATENT DOCUMENTS

EP 0 681 267 11/1995

* cited by examiner

*Primary Examiner*—Kee M. Tung
(74) *Attorney, Agent, or Firm*—Frommer Lawrence & Haug LLP; William S. Frommer; Samuel S. Lee

(57) ABSTRACT

To provide a drawing device with which drawing speed can be increased without escalation of price of it. A drawing device is established as a GPU on an entertainment device to perform the drawing to a frame buffer in terms of one of different interleaved patterns. Each interleaved pattern is specified by a combination of pixel segments in the frame buffer. The GPU identifies the shape of a figure to be drawn and selects the interleaved pattern that fits for the selected shape of the figure. The pixel segments specified in the frame buffer are not overlapped with other pixel segments in the same interleaved pattern regardless of which interleaved pattern is selected.

8 Claims, 18 Drawing Sheets

| A0 | A1 | A2 | A3 | A4 | A5 | A6 | A7 | A0 | A1 | A2 | A3 | A4 | A5 | A6 | A7 |
|---|---|---|---|---|---|---|---|---|---|---|---|---|---|---|---|
| A8 | A9 | A10 | A11 | A12 | A13 | A14 | A15 | A8 | A9 | A10 | A11 | A12 | A13 | A14 | A15 |
| A0 | A1 | A2 | A3 | A4 | A5 | A6 | A7 | | | | | | | | |
| A8 | A9 | A10 | A11 | A12 | A13 | A14 | A15 | | | | | | | | |
| | | | | | | | | | | | | | | | |
| | | | | | | | | | | | | | | | |
| | | | | | | | | | | | | | | | |
| | | | | | | | | | | | | | | | |

FIG. 8A

| 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|
| 0 | 0 | 0 | 0 | 0 | 0 | 0 | 0 | 1 | 1 | 1 | 1 | 1 | 1 | 1 | 1 |
| 2 | 2 | 2 | 2 | 2 | 2 | 2 | 2 | | | | | | | | |
| 2 | 2 | 2 | 2 | 2 | 2 | 2 | 2 | | | | | | | | |
| | | | | | | | | | | | | | | | |
| | | | | | | | | | | | | | | | |
| | | | | | | | | | | | | | | | |
| | | | | | | | | | | | | | | | |

FIG. 8B

| A0 | A1 | A2 | A3 | A4 | A5 | A6 | A7 | A8 | A9 | A10 | A11 | A12 | A13 | A14 | A15 |
|----|----|----|----|----|----|----|----|----|----|-----|-----|-----|-----|-----|-----|
| A8 | A9 | A10 | A11 | A12 | A13 | A14 | A15 | A0 | A1 | A2 | A3 | A4 | A5 | A6 | A7 |

FIG. 9A

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 |
| 2 | 2 | 2 | 2 | 2 | 2 | 2 | 2 | 2 | 2 | 2 | 2 | 2 | 2 | 2 | 2 |
| 3 | • | • | • | • | • |   |   |   |   |   |   |   |   |   |   |
| 4 | • | • | • | • |   |   |   |   |   |   |   |   |   |   |   |
| 5 | • | • | • |   |   |   |   |   |   |   |   |   |   |   |   |
| 6 | • | • |   |   |   |   |   |   |   |   |   |   |   |   |   |
| 7 | • |   |   |   |   |   |   |   |   |   |   |   |   |   |   |

|   | 0 | 1 | 2 | | | | | | | | | | | | | |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 8 | 9 | 10 | 11 | 12 | 13 | 14 | 15 | 0 | 1 | 2 | 3 | 4 | 5 | 6 | 7 |
| 2 | 4 | 5 | 6 | 7 | 0 | 1 | 2 | 3 | 12 | 13 | 14 | 15 | 8 | 9 | 10 | 11 |
|   | 12 | 13 | 14 | 15 | 8 | 9 | 10 | 11 | 4 | 5 | 6 | 7 | 0 | 1 | 2 | 3 |
|   | 2 | 3 | 0 | 1 | 6 | 7 | 4 | 5 | 10 | 11 | 8 | 9 | 14 | 15 | 12 | 13 |
|   | 10 | 11 | 8 | 9 | 14 | 15 | 12 | 13 | 2 | 3 | 0 | 1 | 6 | 7 | 4 | 5 |
|   | 6 | 7 | 4 | 5 | 2 | 3 | 0 | 1 | 14 | 15 | 12 | 13 | 10 | 11 | 8 | 9 |
|   | 14 | 15 | 12 | 13 | 10 | 11 | 8 | 9 | 6 | 7 | 4 | 5 | 2 | 3 | 0 | 1 |
| 8 | 1 | 0 | 3 | 2 | 5 | 4 | 7 | 6 | 9 | 8 | 11 | 10 | 13 | 12 | 15 | 14 |
|   | 9 | 8 | 11 | 10 | 13 | 12 | 15 | 14 | 1 | 0 | 3 | 2 | 5 | 4 | 7 | 6 |
|   | 5 | 4 | 7 | 6 | 1 | 0 | 3 | 2 | 13 | 12 | 15 | 14 | 9 | 8 | 11 | 10 |
|   | 13 | 12 | 15 | 14 | 9 | 8 | 11 | 10 | 5 | 4 | 7 | 6 | 1 | 0 | 3 | 2 |
|   | 3 | 2 | 1 | 0 | 7 | 6 | 5 | 4 | 11 | 10 | 9 | 8 | 15 | 14 | 13 | 12 |
|   | 11 | 10 | 9 | 8 | 15 | 14 | 13 | 12 | 3 | 2 | 1 | 0 | 7 | 6 | 5 | 4 |
|   | 7 | 6 | 5 | 4 | 3 | 2 | 1 | 0 | 15 | 14 | 13 | 12 | 11 | 10 | 9 | 8 |
|   | 15 | 14 | 13 | 12 | 11 | 10 | 9 | 8 | 7 | 6 | 5 | 4 | 3 | 2 | 1 | 0 |

MEMORY ACCESS DEVICE, SEMICONDUCTOR DEVICE, MEMORY ACCESS METHOD, COMPUTER PROGRAM AND RECORDING MEDIUM

CROSS REFERENCE TO RELATED APPLICATIONS

The present application claims priority from Japanese Application Nos. 2002-56548 filed Mar. 1, 2002 and 2003-1595 filed Jan. 7, 2003, the disclosures of which are hereby incorporated by reference herein.

BACKGROUND OF THE INVENTION

The present invention relates to a memory access technique that can be applied to graphic computers and entertainment devices which involve pictorial representations. More specifically, the present invention relates to a mechanism with which to allow access to a memory at high speed in terms of one of different interleaved patterns.

Typical entertainment devices constructed with a graphics computer read and execute a predetermined program and data from a recording medium, and perform image processing and sound processing according to instructions from a user. The image processing in this case can generally be classified into geometry processing and rendering processing.

The term "geometry processing" as it is generally understood in the art and used here, means the process by which coordinate transformation according to the viewpoint coordinates, perspective transformation according to the distance, clipping, and light source calculation are performed on polygons that make up an object image. With the geometry processing, farther objects appear smaller and dim. The results of the geometry processing are produced as an image display command which is also referred to as a "display list".

The term "rendering processing" as it is generally understood in the art and used here, means the process by which the above-mentioned image display commands are interpreted to draw image data (i.e., data with pixels and Z values) to an image memory and convert the results of drawing into a predetermined signal format for display on a screen. The drawing and conversion are performed using color data assigned to each vertex of a polygon and a Z value (depth) that specifies the distance from the pixel to the plane of the eye, considering the Z values and the color of all pixels of the polygon. The image memory with the image data is updated every 1/60 seconds, for example. Thus, the object appears moving on a screen.

How fast an image is displayed to the screen depends on the access (reading/writing) speeds to the image memory, i.e., drawing speeds during the rendering operation. Images are displayed slowly at a lower drawing speed. To increase the display speeds, a memory with a large capacity which can be accessed at high speed may be used. Such memories are, however, expensive and lead to escalation of price of entertainment device products.

The present invention is made with respect to the above-mentioned circumstances. An object of the present invention is to provide an improved mechanism with which to allow access to a memory at a higher speed even without the use of a memory which can be accessed at high speed.

SUMMARY OF THE INVENTION

The present invention provides a memory access device, a memory access control method, as well as a semiconductor device, a computer program and a recording medium that are used to implement the memory access device on a computer.

A memory access device of the present invention is a memory access device for accessing a memory in terms of one of different interleaved patterns, the memory having a plurality of memory segments that are arranged in the form of a matrix, comprising: pattern selecting means for selecting an interleaved pattern to be used for access; and segment accessing means for simultaneously accessing a plurality of memory segments that are assigned thereto for the selected interleaved pattern without switching the addresses of the memory segments, the segment accessing means being allocated with a memory segment which is not overlapped with other memory segments in the selected interleaved pattern regardless of which interleaved pattern is selected by the pattern selecting means.

With this memory access device, it is not necessary to switch addresses even when a certain interleaved pattern is used in place of another interleaved pattern. A single access completes the access to a memory. Accordingly, the access speed is increased without using a memory that can be accessed at high speed.

The term "access" as used herein includes access to a memory both to write and to read data. The term "interleaved pattern" as used herein refers to a combined pattern of memory segments that are selected for simultaneous accessing in the interleaving process. Each of different interleaved patterns has the same number of memory segments as other interleaved patterns in different combinations from each other.

The memory which is used when the memory access device is applied to, for example, an image processing unit, is an image memory in which the memory segments are pixel segments. In such a case, the pattern selecting means is configured to select an interleaved pattern that fits the shape of an image to be drawn to the image memory. The term "pixel segment" as used herein means a memory area to which a pixel is written. For example, an image memory having an array of 16×16 pixel segments is available for 256 pixels. The 256 pixels can be written in the image memory and used as a part of image data. The pattern selecting means specifically selects, as a proper interleaved pattern, the interleaved pattern with which the number of access cycles becomes minimum when an image with the specified shape is to be drawn.

The image memory is made up of a group of a plurality of memory blocks. Each memory block has pixel segments that are to be accessed in terms of the interleaved pattern. Each memory block includes the number of memory banks that can be accessed simultaneously. The memory access device is configured such that the pixel segments to be accessed are specified by a combination of a first address information and a second address information. The first address information is for identifying the memory blocks. The second address information is for identifying the pixel segments in the memory bank. Each of the plurality of memory blocks has pixel segments that are arranged in the form of a matrix, the matrix having address lines divided into column addresses and row addresses. The second address information is specified by a row address, a column address, or a combination thereof.

From the viewpoint of improving the efficiency of the interleaving process, a table may be provided that defines the relation between the pixel segments in the memory block and the memory banks allocated thereto. The memory banks to be accessed may be determined based on this table.

A semiconductor device of the present invention is a semiconductor device mounted on a computer that is adapted to access to a memory, the memory having a plurality of memory segments that are arranged in the form of a matrix, the semiconductor device being configured to direct the computer to establish pattern selecting means for selecting an interleaved pattern to be used for access and segment accessing means for simultaneously accessing a plurality of memory segments corresponding to the selected interleaved pattern, and to operate the computer such that the access to the memory is made in terms of one of the different interleaved patterns without switching the addresses of the memory segments, by means of allocating, to the segment accessing means, a memory segment which is not overlapped with other memory segments in the selected interleaved pattern regardless of which interleaved pattern is selected.

An access control method of the present invention is a method for controlling access to a memory performed by a computer, the access being made in terms of one of different interleaved patterns, the memory having a plurality of memory segments that are arranged in the form of a matrix, the method comprising the steps of specifying a plurality of memory segments to which access can be made simultaneously, such that the same memory segments are not overlapped in the interleaved pattern regardless of which interleaved pattern is selected; selecting the interleaved pattern to be used for the access; and accessing simultaneously the plurality of memory segments that are allocated for the selected interleaved pattern, without switching the addresses of them.

A computer program of the present invention is a computer program to operate a computer as the memory access device of the present invention. A recording medium of the present invention is a computer-readable recording medium on which such a computer program is recorded.

BRIEF DESCRIPTION OF THE DRAWINGS

FIG. 8 is a view for explaining the principle of a conventional interleaving process, in which FIG. 8A shows bank addresses for an interleaved pattern and FIG. 8B shows corresponding memory addresses;

FIG. 9 is a view for explaining the principle of an interleaving process according to an embodiment of the present invention, in which FIG. 9A shows bank addresses and FIG. 9B shows memory addresses;

FIG. 27 is a view for explaining segments (8×2) that are accessed simultaneously when an interleaved pattern Pb is chosen;

FIG. 28 is a view for explaining segments (4×4) that are accessed simultaneously when an interleaved pattern Pc is chosen;

FIG. 31 is a view showing details of a table.

DETAILED DESCRIPTION OF THE PREFERRED EMBODIMENT

A preferred embodiment of the present invention is described below.

Figure 1:
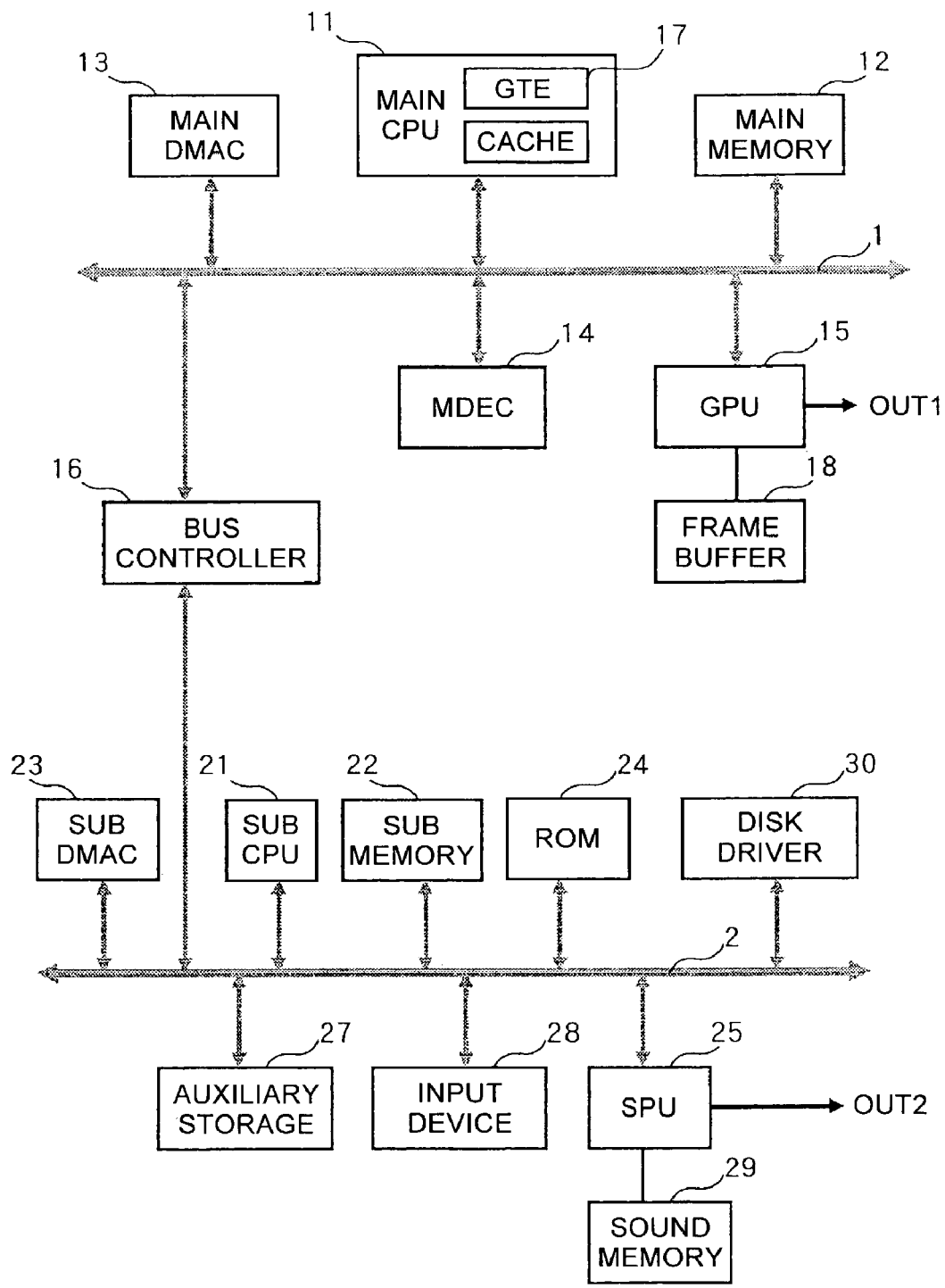
FIG. 1 is a block diagram showing a configuration of an entertainment device to which the present invention is applied.

A memory access device and a memory access control method of the present invention may be implemented in an entertainment device having a configuration of, for example, FIG. 1.

<Overview of Entertainment Device>

The entertainment device is a kind of computer that reads and executes computer programs for entertainment purposes to perform desired image processing and sound processing according to instructions from a user. The image processing can be classified into the "geometry processing" and the "rendering processing". What these terms mean is as described above. The sound processing means the process to produce sounds such as voices and tracks in conjunction with the image processing through a speaker or a similar piece of equipment. This is done by an SPU (sound processing unit) 25 in FIG. 1, reading sound data from a sound memory 29 and performing desired operations.

The geometry processing is mainly performed by a main CPU (central processing unit) 11 and a GTE (geometry transfer engine) 17 on a main bus 1 shown in FIG. 1. The GTE is a processing unit that assists the main CPU 11. The rendering processing is mainly performed by a GPU (graphic processing unit) 15 which is an example of a memory access device of the present invention. The GPU 15 comprises a processor (semiconductor device). The processor itself provides a major function of the computer. More specifically, the processor reads the computer program of the present invention and executes it to perform an interleaving process of which details are described below. Thus, unique and distinctive rendering processing can be achieved that is quite different from conventional counterparts.

In this embodiment, a frame buffer 18 built with a DRAM which is an inexpensive image memory is used as a memory which is to be accessed by the GPU 15 for rendering processing.

The entertainment device operates while sequentially closing and opening main and sub bus systems with a bus controller 16. The main bus system comprises a main CPU 11, a main memory 12, a main DMAC (dynamic memory access controller) 13, an MPEG decoder (abbreviated as "MDEC") 14, and the GPU 15, which are connected to each other via a main bus 1. The sub bus system comprises a sub CPU 21, a sub memory 22, a sub DMAC 23, a ROM (read only memory) 24, an SPU 25, an auxiliary storage 27, an input device 28 and an disk driver 30, which are connected to each other via a sub bus 2.

When the entertainment device is turned on, the main CPU 11 loads a boot program from the ROM 24 and starts executing the boot program to invoke the operating system. Then, the main CPU 11 loads an entertainment application program and other necessary data from the auxiliary storage 27 into the main memory 12 and the devices connected to the sub bus 2 to establish an environment that is required for the subsequent operations. The main CPU 11 then produces command packets according to commands from the application program and instructions that are supplied via the input device 28. In this way, the main CPU 11 performs the control for the above-mentioned image processing and sound processing.

When the data read from the auxiliary storage 27 are image data that were subjected to compression and encoding with orthogonal transformation such as discrete cosine transform, the MDEC 14 decodes the data and records them into the main memory 12. The main DMAC 13 controls operations such as DMA transfer to and from each device connected to the main bus 1. The main DMAC 13 also controls each device connected to the sub bus 2 when the bus controller 16 is opened. The sub DMAC 23 controls operations such as DMA transfer to and from each device connected to the sub bus 2 that is controlled by the sub CPU 21.

The sub DMAC 23 is allowed to access the bus only when the bus controller 16 is closed.

<GPU Configuration>

Figure 2:
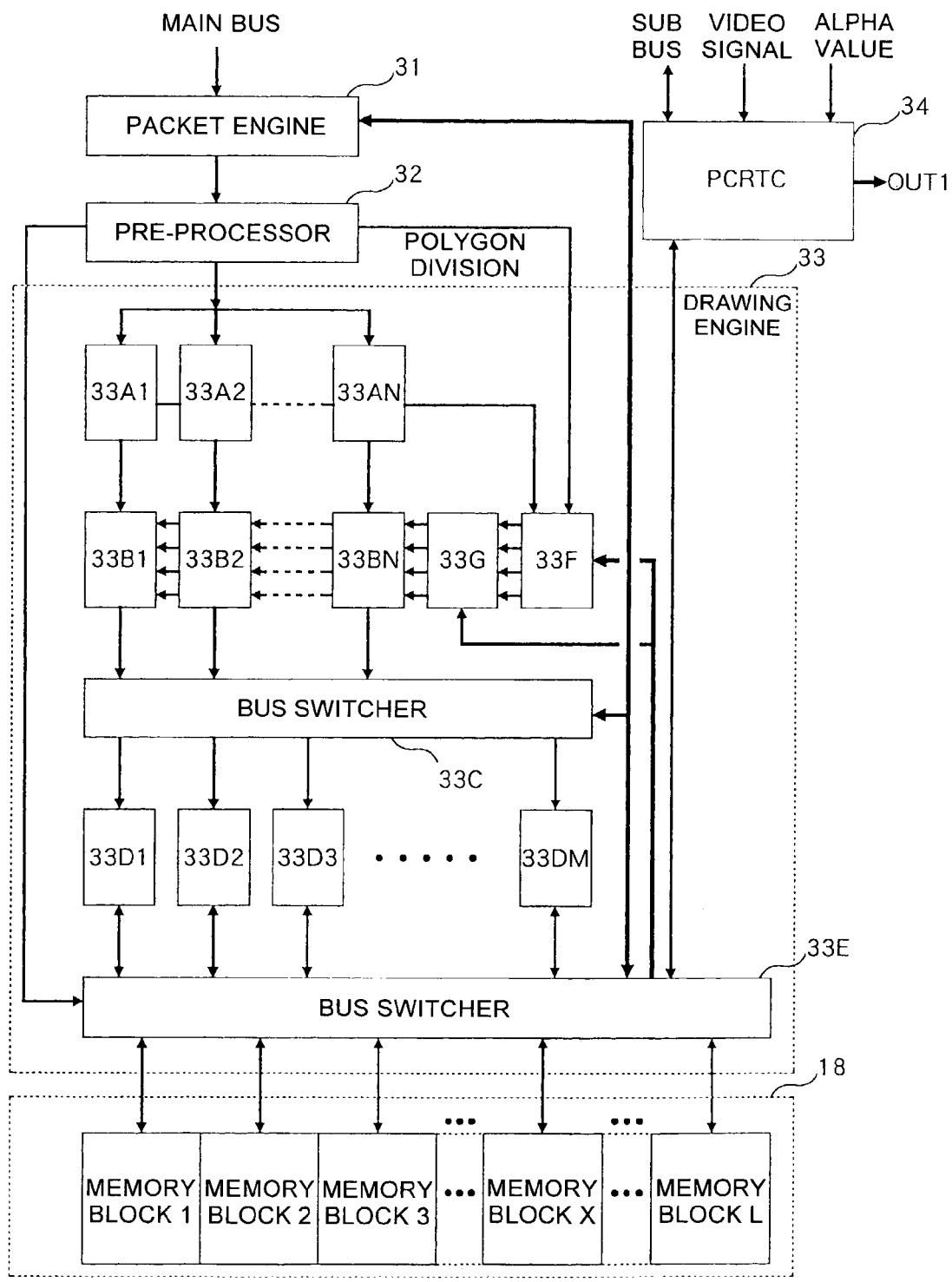
FIG. 2 is a view of a specific configuration of a GPU in the entertainment device.

An exemplified configuration of the GPU 15 is shown in FIG. 2. The GPU 15 writes the image data that are used to draw each polygon, into the frame buffer 18, by the cooperation between a pre-processor 32 and a drawing engine 33, according to the image display commands that are transmitted as a command packet from the main CPU 11 or the main DMAC 13 to a packet engine 31 via the main bus 1. In addition, the GPU 15 reads the image data from the frame buffer 18 in a predetermined output format. The image data in this case are represented by combinations of pixels or other control information. The GPU 15 then displays an image that is specified by the image data via a PCRTC 34, on a display screen (not shown). The PCRTC 34 is a device that is adapted to receive, from the main CPU, video signals and alpha values (transmission coefficients) that are required for displaying images on the display screen. The PCRTC 34 also has a function of generating display addresses and other control information (e.g., mask information which will be described later) that are used when the image data in the frame buffer 18 are read. For the display addresses, one display address is produced at each display clock.

Figure 3:
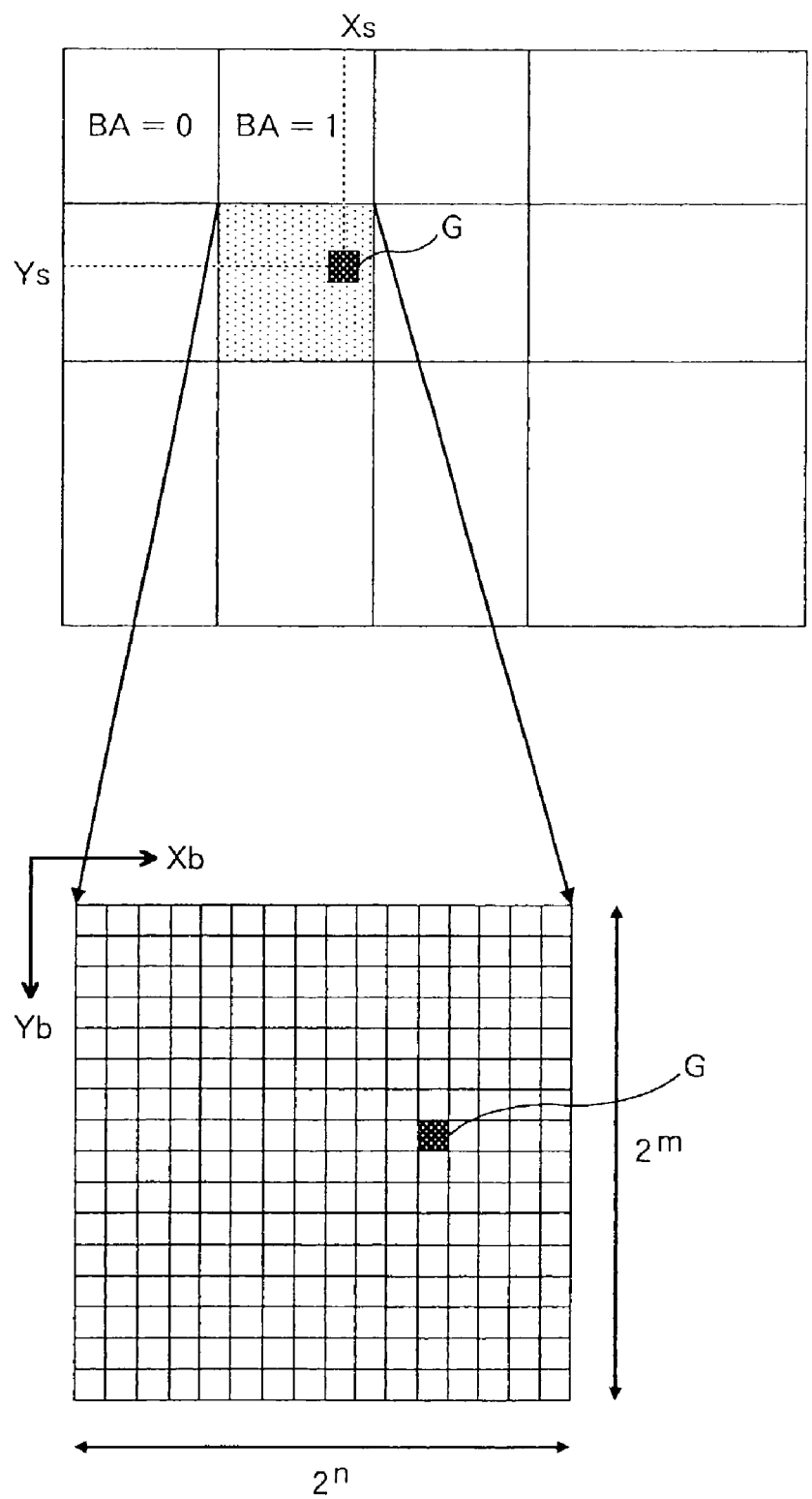
FIG. 3 is a view showing the relation among a frame buffer, memory blocks, and pixel segments.

The frame buffer 18 is made up of a set of memory blocks (memory blocks [1] to [X] to [L] in FIG. 2). The relation among the frame buffer 18, the memory blocks and the pixel segments into which pixels are to be written is as shown in FIG. 3. More specifically, the frame buffer 18 is divided into a plurality of memory blocks. Each memory block is differentiated from others in accordance with block addresses (BA=0, BA=1, ... ). Each memory block contains $2^m$ by $2^n$ pixel segments, wherein m and n is a natural number. The values of m and n may be either $m \leq n$ or $m > n$, depending on the standards on which the frame buffer 18 is based. When m=n=4, the memory block contains 256 square pixel segments.

Each pixel segment is specified by $Xb = X_s \bmod 2^n$ and $Yb = Y_s \bmod 2^m$, wherein Xb represents row addresses while Yb represents column address in FIG. 3.

The memory blocks in the frame buffer 18 correspond to the display segment of the display screen. As apparent from the figure, the location of a pixel G in a certain pixel segment can be determined according to the screen coordinates (Xs,Ys). The above-mentioned image data are formed of a combination of pixels written in such pixel segments.

The pre-processor 32 performs the process of generating a polygon according to the image display command that is received from the main bus 1 via the packet engine 31. In addition, the pre-processor 32 pre-processes polygons in a predetermined manner to generate information about coordinates of vertices of the polygons, control information for the interleaving process, and other data that are necessary for the drawing engine 33.

The pre-processing provided by the pre-processor 32 is as follows. First, the pre-processor 32 generates address information based on coordinates of polygon vertices and texture coordinates. The coordinates of polygon vertices in this embodiment are at [(X0,Y0),(X1,Y1),(X2,Y2)] while the texture coordinates are at [(U0,V0),(U1,V1),(U2,V2)]. The address information is used for looking ahead the texture to be placed on the polygon that is processed by the N number of texture engines 33B1, 33B2, ..., 33BN. The pre-processor 32 then reproduces selection information for a mipmap as described below, using a polygon edge slope, a texture address slope, and an area of the polygon. In this embodiment, the polygon edge slope is [(X1−X0)/(Y1−Y0), (X2−X0)/(Y2−Y0),(X1−X2)/(Y1−Y2)] and the texture address slope is [(U1−U0)/(Y1−Y0),(U2−U0)/(Y2−Y0), (U1−U2)/(Y1−Y2)],[(V1−V0)/(Y1−Y0),(V2−V0)/ (Y2−Y0),(V1−V2)/(Y1−Y2)], etc. Such information is supplied to a texture cache 33F.

Then, the coordinates of polygon vertices, [(X0,Y0),(X1, Y1),(X2,Y2)], may be sorted in the order of vertices on the left edge, that is, (X0,Y0)→(X1,Y1)→(X2,Y2) or in the order of vertices on the right edge, that is, (X2,Y2)→(X1, Y1)→(X0,Y0). Alternatively, scanning may be made on both end points or a texture address.

The pre-processor 32 stores the information obtained by the pre-processing described above, in a work memory which is not shown. When the drawing engine 33 is ready for processing a subsequent polygon, the pre-processor 32 transfers the information necessary for processing this single polygon from the work memory to the N number of polygon engines 33A1, 33A2, . . . , 33AN. In response to this, the drawing engine 33 starts drawing of the new polygon. These operations are repeated for all polygons.

The drawing engine 33 comprises the N number of polygon engines 33A1, 33A2, . . . , 33AN, the N number of texture engines 33B1, 33B2, . . . , 33BN, a first bus switcher 33C, the M number of pixel engines 33D1, 33D2, . . . , 33DM, a second bus switcher 33E, a texture cache 33F, and a color look-up table (CLUT) cache 33G. The polygon engines 33A1, 33A2, . . . , 33AN are connected to the pre-processor 32. The texture engines 33B1, 33B2, . . . , 33BN are connected to the polygon engines 33A1, 33A2, . . . , 33AN, respectively. The first bus switcher 33C is connected to the texture engine 33B1, 33B2, . . . , 33BN. The pixel engines 33D1, 33D2, . . . , 33DM are connected to the first bus switcher 33C. The second bus switcher 33E is connected to each of the pixel engines 33D1, 33D2, . . . , 33DM. The texture cache 33F is connected to the second bus switcher 33E. The color look-up table (CLUT) cache 33G is connected to the texture cache 33F.

The N number of polygon engines 33A1, 33A2, . . . , 33AN sequentially generate polygons according to the image display commands using the polygon data subjected to the pre-processing by the pre-processor 32. The polygon engines 33A1, 33A2, . . . , 33AN then perform parallel processing of, for example, shading for each polygon generated.

The N number of texture engines 33B1, 33B2, . . . , 33BN perform texture mapping and mipmap operations in parallel for each polygon that is generated by the polygon engines 33A1, 33A2, . . . , 33AN using the texture data that are provided from the texture cache 33F via the CLUT cache 33G. The "texture mapping" is a technique to place a 2D image (picture) prepared separately as a texture source image, that is, a texture pattern, onto the surface of a polygon. The "mipmapping" is a technique for making textures that look good at different distances when a 3D object moves by interpolating the pixels to lower resolution.

The texture cache 33F is previously supplied with address information from the pre-processor 32. This address information is associated with a texture segment having the texture pattern to be placed on the polygon that is processed by the N number of texture engines 33B1, 33B2, . . . , 33BN. The necessary data for the texture mapping are transferred from the texture segment on the frame buffer 18 according this address information. Furthermore, only the data with a resolution necessary for the mipmapping are selected from all associated data and are transferred as mipmap texture data. The CLUT cache 33G is supplied with CLUT data from a CLUT segment on the frame buffer 18. The CLUT data are to be looked up for drawing a polygon.

The polygon already subjected to the texture mapping and the mipmapping by the N number of texture engines 33B1, 33B2, . . . , 33BN is transferred to the M number of pixel engines 33D1, 33D2, . . . , 33DM via the first bus switcher 33C. Each of the pixel engines 33D1, 33D2, . . . , 33DM performs various kinds of image processing in parallel, such as known Z buffer processing and anti-aliasing, to provide the depth of a rendered image. The pixel engines 33D1, 33D2, . . . , 33DM then produces the M number of pixels. Each pixel is written into the frame buffer 18 via the second bus switcher 33E as needed. The second bus switcher 33E is supplied with control information for the interleaving process from the pre-processor 32.

(Interleaving Process)

The interleaving process is the process of accessing the frame buffer 18 (in this embodiment, writing and reading the pixels) in terms of one of interleaved patterns. The interleaving process is performed by the drawing engine 33. For example, to write a pixel, two or more pixels suitable for the shape of the subjected polygon can be written simultaneously into the frame buffer 18.

The interleaving process according to this embodiment is described in detail now.

For the purpose of convenience, the above-mentioned "m" and "n" are assumed to be "4", that is, a single memory block in the frame buffer 18 has a capacity of receiving 16×16 pixels to render a part of the subjected image.

First, an exemplified configuration of the second bus switcher 33E that provides the interleaving process and the relation with the frame buffer 18 are described.

Figure 4:
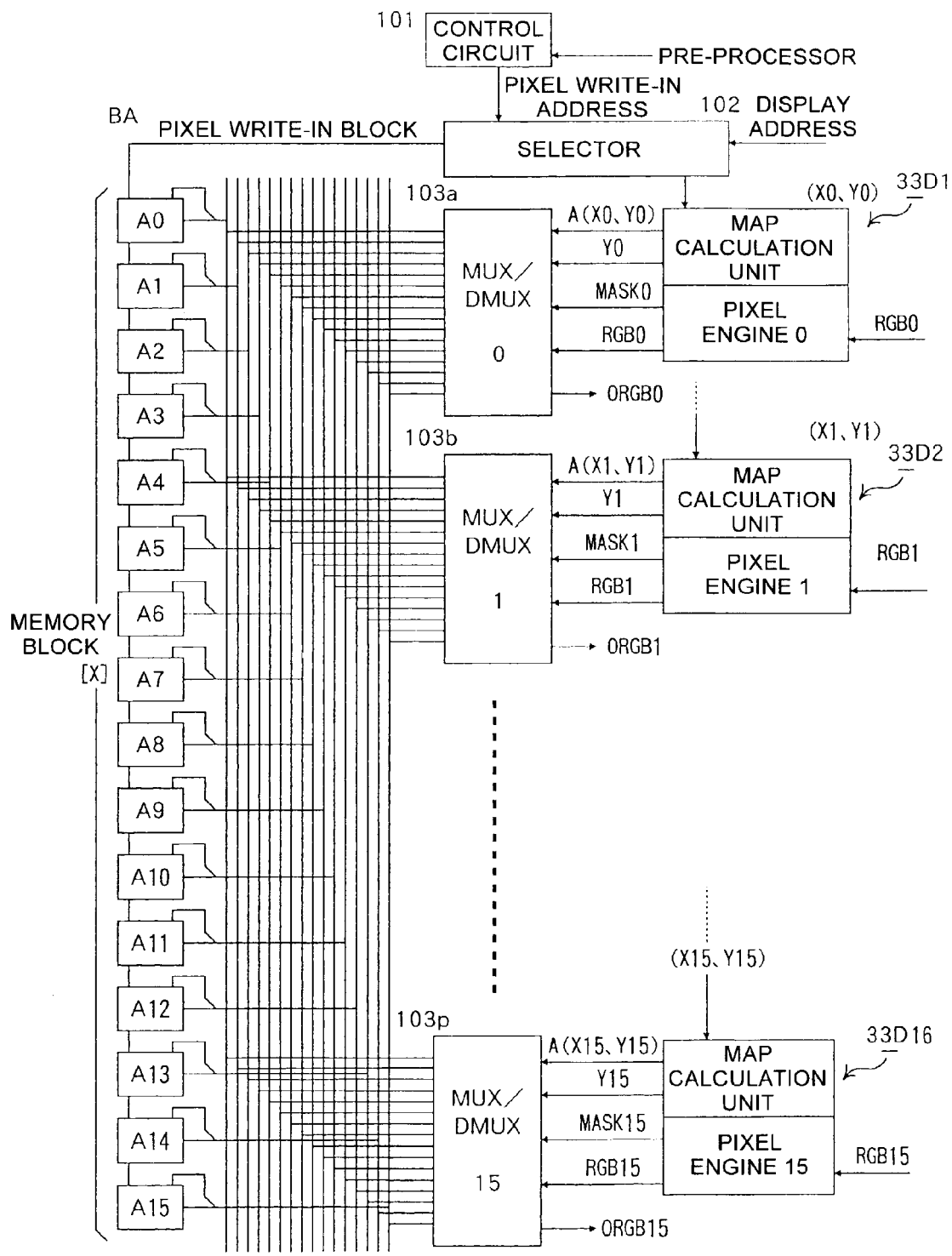
FIG. 4 is a view showing a configuration of a second bus switcher in a GPU and the relation with memory banks.
Figure 5:
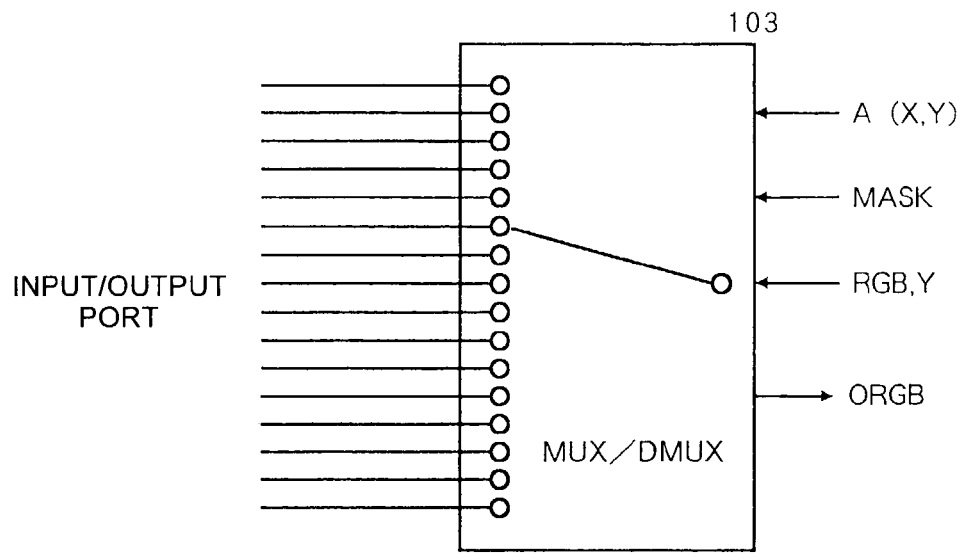
FIG. 5 is a view of a detailed configuration of an MUX/DMUX.

As shown in FIG. 4, the second bus switcher 33E comprises a control circuit 101, a selector 102, and multiplexer/demultiplexers (hereinafter, abbreviated as "MUX/DMUXs") 103a, 103b, . . . , 103p. The control circuit 101 is adapted to produce pixel write-in address according to an instruction from the pre-processor 32. The selector 102 enables necessary pixel engines 33D1, 33D2, 33D3, . . . , 33DM to operate using a pixel write-in address supplied from the control circuit 101 and a display address supplied from the PCRTC 34 (see FIG. 2). An example of how the MUX/DMUXs are used is shown in FIG. 5.

The pre-processor 32 and the control circuit 101 contribute to providing the pattern selecting means of the present invention. The pixel engine 33D1, etc. and the selector 102 serve to provide the segment accessing means.

Each of the MUX/DMUXs 103a, 103b, . . . , 103p comprises sixteen input/output ports to allow selective access to the memory banks A0 to A15 in one of the memory blocks [1], [2], . . . , [X], . . . , [L] (the memory block [X] in the example shown in FIG. 4).

Figure 6:
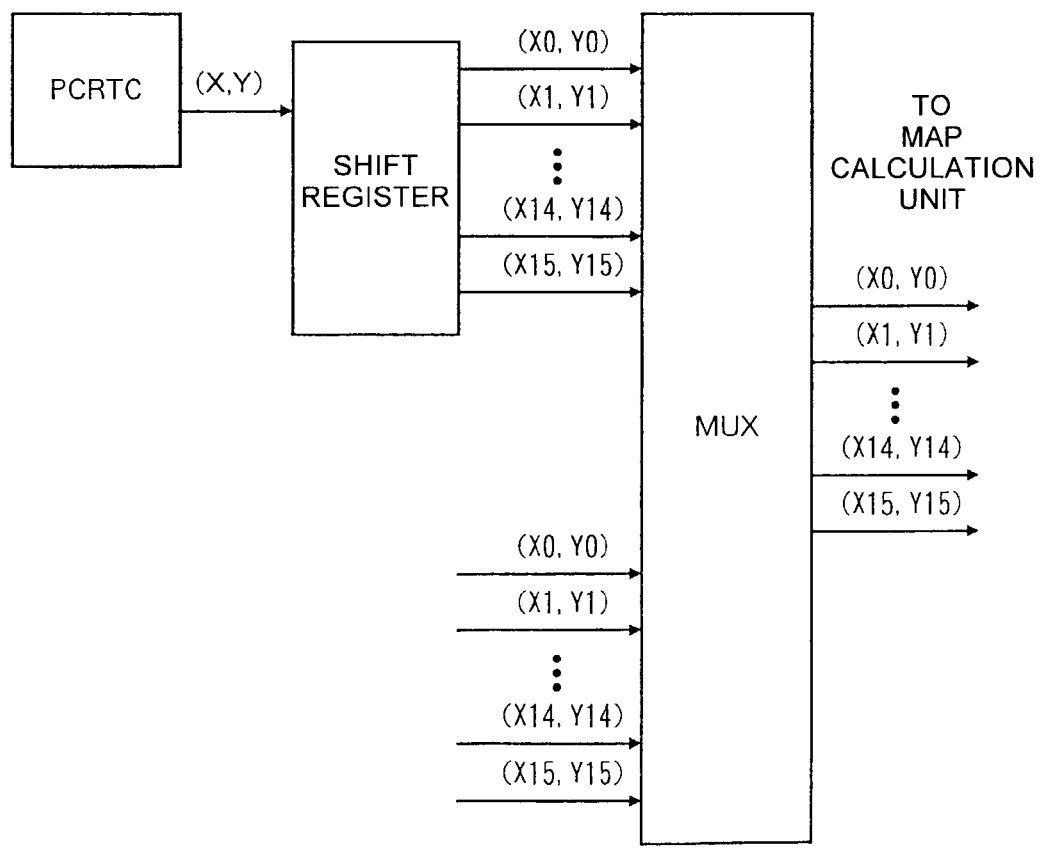
FIG. 6 is a view showing an interface between a PCRTC and a second bus switcher.

Since one display address is produced from the PCRTC 34 at each display clock, it is necessary to store the display addresses for several clocks and to allow simultaneous access to the frame buffer 18 in order to display an image that is rendered with a plurality of display clocks. With this respect, as shown in FIG. 6, the second bus switcher 33E stores the display addresses (depicted by "X,Y" in the figure) in a shift register. When a predetermined number of display addresses are stored in the shift register, a multiplexer (MUX) reads the display addresses from the shift register and produces them via the selector 102. The MUX in FIG. 6 is a component that is included in the selector 102.

Turning back to FIG. 4, the selector 102 produces a block address BA to enable a subjected memory block, using the display address and the pixel write-in address. The selector 102 also produces memory addresses (X0,Y0 to X15,Y15) that are used to selectively enable the pixel engines 33D1, 33D2, 33D3, . . . , 33DM corresponding to the memory banks of the memory block that is specified with the block address BA.

Each of the pixel engines 33D1, 33D2, 33D3, . . . , 33DM includes a MAP calculation unit for calculating addresses. It produces selection information (A(X0,Y0) to A(X15,Y15)) and Y addresses (Y0 to Y15) to select the memory banks, and mask signals (MASK0 to MASK15) to the MUX/DMUXs 103a, 103b, . . . , 103p, based on the above-mentioned memory addresses (X0,Y0 to X15,Y15) received from the selector 102 and RGB signals RGB0 to RGB15 from the PCRTC 34.

The selection information A(X,Y) is the information to specify which pixels from which pixel engines 33D1, 33D2, 33D3, . . . , 33DM are written into which memory bank.

The mask signal MASK is the signal to mask a given memory bank. When the memory bank is masked, no pixel can be written in it.

The Y addresses (Y0 to Y15) are the address information to specify the location at which writing is made in the memory bank. As to the address information in the memory block for the interleaving process, two or more addresses are required in a single memory bank when the memory block is made up of memory banks that are arranged in the form of a matrix. On the contrary, the range to be accessed can be specified with a single address for each memory bank in the interleaving process according to this embodiment. This is because the same memory bank is never enabled redundantly in a single interleaved pattern. In this embodiment, this address is used as the "Y address". The Y address simplifies the addressing operation to access the memory. The Y address is calculated by the MAP calculation unit for each interleaved pattern in the rendering processing.

Figure 7:
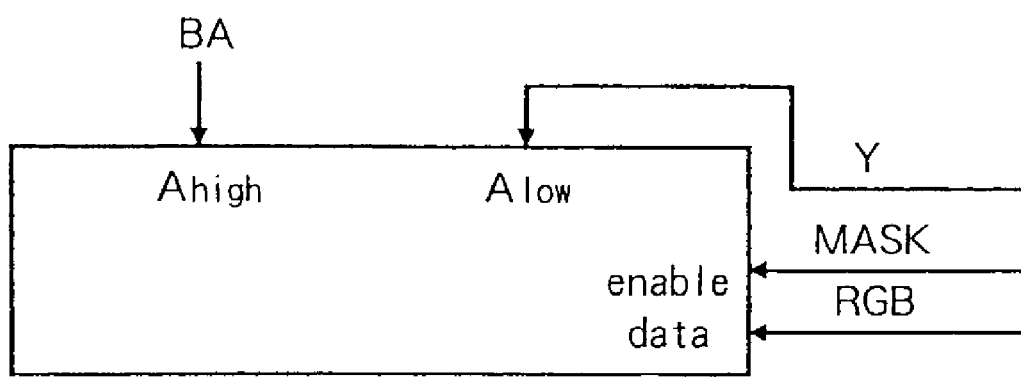
FIG. 7 is a connection diagram of a memory bank.

Each memory block is supplied with, as shown in FIG. 7, the block address BA as a high address (A high). The above-mentioned Y address is supplied to the memory block as a low address (A low) to specify the location in the memory banks A0 to A15 in the memory block that is designated with the block address BA. In other words, these two addresses can be used to specify which pixel location in the memory block should be enabled. The RGB signal is supplied to a data terminal of each memory block while the mask signal MASK is supplied to an enable terminal thereof as an enable signal.

In FIG. 4, other memory blocks than the memory block [X] are not illustrated for the purpose of clarification. However, it should be understood that these remaining memory blocks are similar in configuration to the memory block [X].

In writing pixels, the MUX/DMUXs 103a, 103b, . . . , 103p each supplies the Y address (Y), the mask signal (MASK) and the RGB signal (RGB) to each memory block according to the selection information (A(X,Y)). In reading pixels, the MUX/DMUXs 103a, 103b, . . . , 103p each supplies an RGB signal (ORGB) for display to the PCRTC 34 also according to the selection information A(X,Y).

Next, the principle of the interleaving process of the present embodiment that is performed by the above-mentioned drawing engine 33 is described in conjunction with a difference from a conventional interleaving process. For the purpose of convenience, the conventional interleaving process is assumed to be based on the same condition as the present embodiment with the sixteen memory banks A0 to A15.

In FIG. 8A, the segments with diagonal lines are the memory banks that are specified simultaneously to achieve the conventional interleaving process. This indicates an example where the pixels are written into the segments in the form of an array with two rows and eight columns.

In the conventional interleaving process, the addresses in the memory block (memory addresses) to be accessed are determined automatically depending on the interleaved pattern. In other words, when the interleaved pattern is changed, it is necessary to change the memory addresses accordingly in the memory block to be accessed. In FIG. 8B, the memory addresses are indicated by "0,0,0, . . . ,", "1,1,1 . . . ,", "2,2,2 . . . ,". The segments with diagonal lines (memory address "0") correspond one by one with the interleaved pattern in FIG. 8A. As apparent from the above, the relation between the interleaved pattern and the memory addresses in the memory block is fixed in the conventional interleaving process. An attempt to access to the memory block with different interleaved patterns requires a plurality of memory addresses to be used to access a single memory bank. This consumes the number of accesses.

On the contrary, the interleaving process of the present embodiment does not change the memory address in the memory block even for different interleaved patterns, as shown in FIG. 9B. The region in the memory block to be accessed is uniquely specified with the above-mentioned "Y address" for each interleaved pattern. Such an operation is feasible because the memory banks A0 to A15 are not overlapped in the same interleaved pattern regardless of which interleaved pattern being used. Accordingly, the interleaving process of the present embodiment does not require to switch the memory addresses. Only a single access is made accordingly.

The portion bordered by broken lines in FIG. 9A corresponds to the memory banks A0 to A15 that are enabled for the same interleaved pattern as the one shown in FIG. 8A. The portion bordered by broken lines in FIG. 9B indicates the memory addresses in this case.

(Selection of Interleaved Pattern)

For the interleaving process, it is necessary to select a proper interleaved pattern depending on the shape of the polygon. In this embodiment, the interleaved pattern with which a polygon can be drawn in the minimum number of accesses is selected as the optimum interleaved pattern. How the selection is made is described below.

Figure 10:
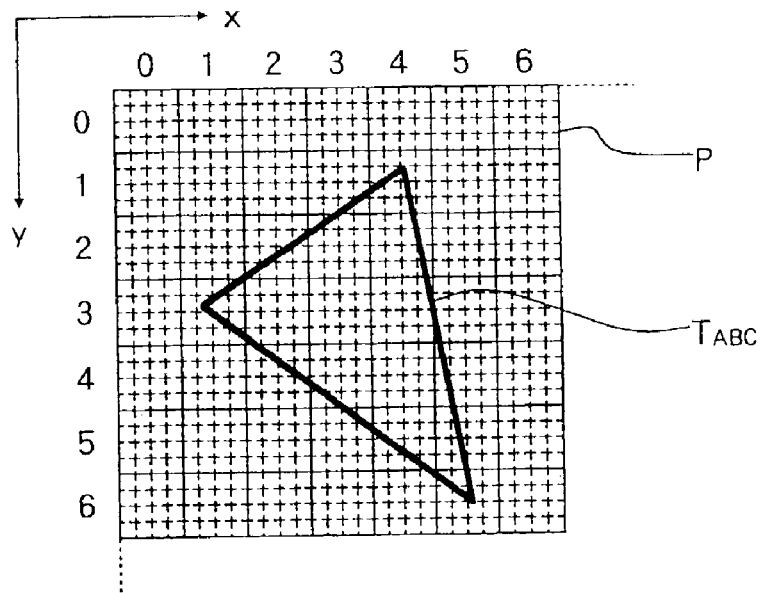
FIG. 10 is a view how the inside the boundary of a first polygon to be drawn to a frame buffer is accessed.

First, the access to the memory block is described in conjunction with a case where a triangle TABC as shown in FIG. 10 is to be drawn. In FIG. 10, the numbers in the X and Y directions correspond to addresses that indicate locations of access in each interleaved pattern when the memory block is accessed using the interleaved pattern of 4×4 pixels. The relative location of access using the interleaved pattern resides at P(x,y). The segments for sixteen pixels in each interleaved pattern correspond to the above-mentioned sixteen memory banks A0 to A15.

The control circuit 101 first specifies the segments to be accessed to draw the triangle TABC in the memory block.

Figure 11:
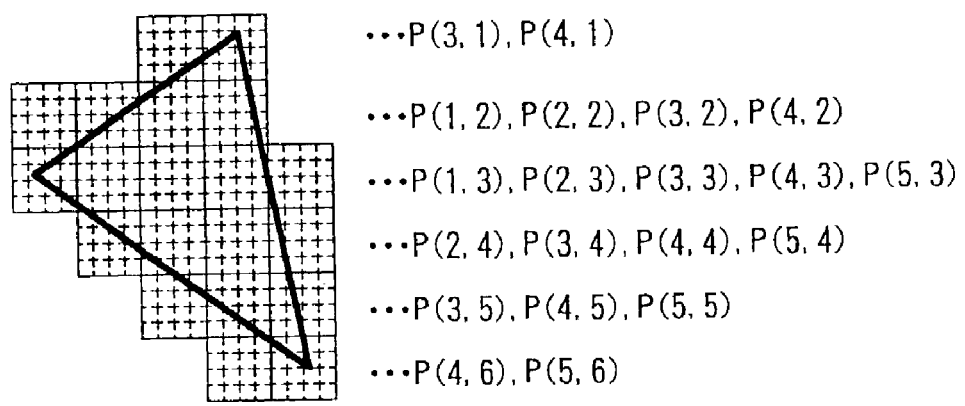
FIG. 11 is a view showing interleaved patterns that are to be accessed for the first polygon.

The triangle TABC in FIG. 10 is associated with twenty segments. They are, as apparent from FIG. 11, P(x,y)=P(3, 1), P(4,1), P(1,2), P(2,2), P(3,2), P(4,2), P(1,3), P(2,3), P(3,3), P(4,3), P(5,3), P(2,4), P(3,4), P(4,4), P(5,4), P(3,5), P(4,5), P(5,5), P(4,6), and P(5,6). The control circuit 101 supplies the pixel write-in address to the selector 102 to allow the access to the twenty segments that are detected in the manner described above.

Figure 12:
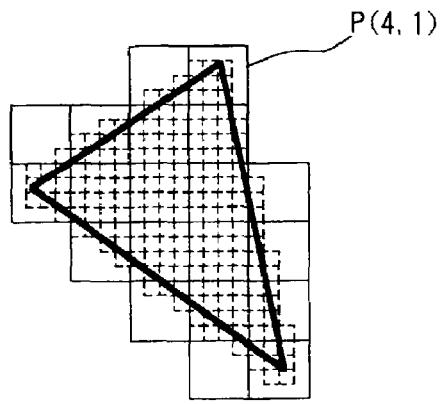
FIG. 12 is a view for explaining a masking process used when access is made for the first polygon.
Figure 13:
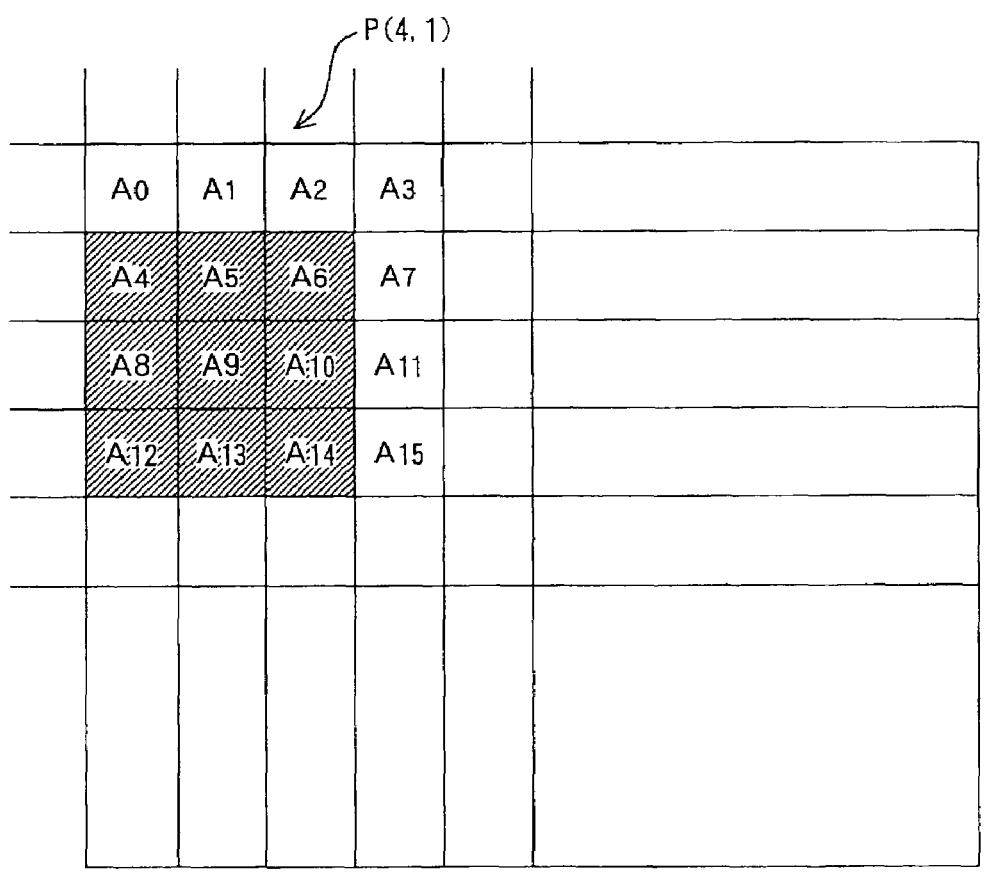
FIG. 13 is a view showing segments that are determined to be accessed as a result of the masking process.

The selector 102 selects a pixel engine to enable the segments to be accessed, using the pixel write-in address supplied from the control circuit 101. In addition, the selector 102 specifies the pixel engine that should be subjected to be masking, according to the mask information MASK from the PCRTC 34. For example, in the memory banks A0 to A15 corresponding to the segment P(4,1) in FIG. 12, the memory banks other than those masked are A4, A5, A6, A8, A9, A10, A12, A13, and A14 (with diagonal lines) in FIG. 13 which is an enlarged view of the segment P(4,1). The pixel engine is selected so that these banks can be selected simultaneously.

The selected pixel engine supplies the selection information A(X,Y), the Y address, the mask information (MASK), and the RGB signal to be written in, to the associated MUX/DMUXs. Each MUX/DMUX connects the pixel engine and the memory banks specified by the supplied information, via the input/output port, to permit the access from the pixel engine to the memory banks. Thus, the triangle TABC as shown in FIG. 10 can be drawn.

Figure 14:
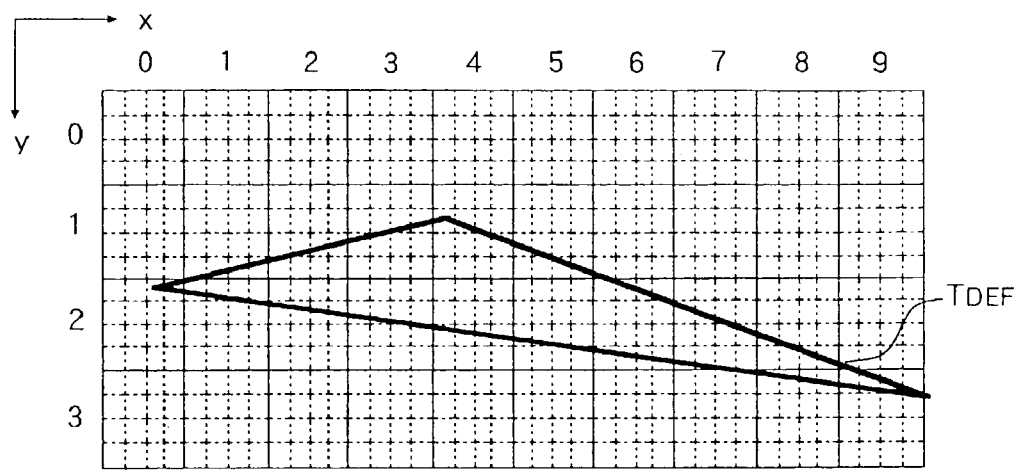
FIG. 14 is a view for explaining how a second polygon to be drawn to memory banks in a frame buffer is accessed in terms of an interleaved pattern of 4×4 segments.

Next, how the number of access cycles can be detected for each interleaved pattern is described. The shape of the polygon in this example is an elongated triangle TDEF as shown in FIG. 14.

(Interleaved Pattern of 4×4)

Figure 15:
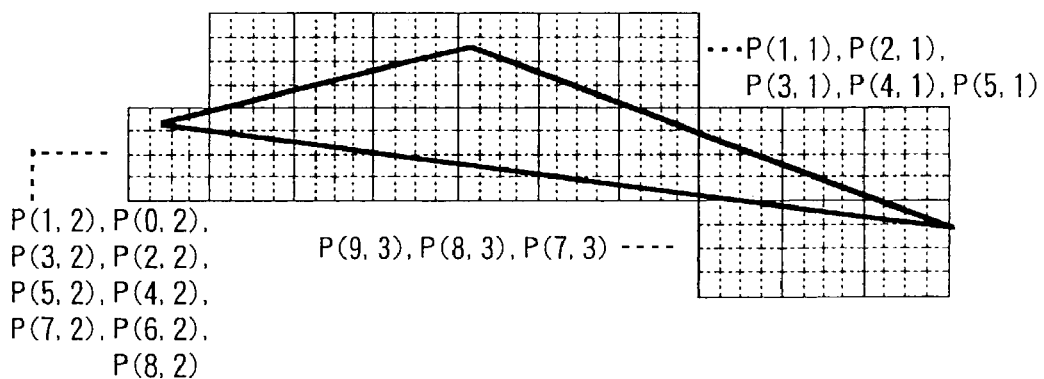
FIG. 15 is a view showing interleaved patterns to be accessed for the second polygon, in which each interleaved pattern is composed of 4×4 segments.
Figure 16:
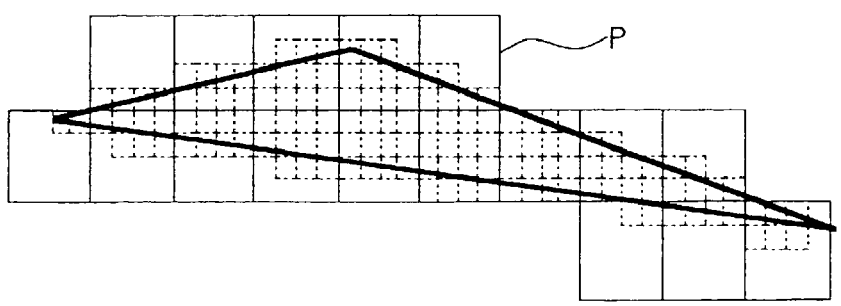
FIG. 16 is a view for explaining a masking process used when access is made for the second polygon in terms of an interleaved pattern of 4×4 segments.

The associated segments are, as apparent from FIG. 15, the following seventeen: P(x,y)=P(1,1), P(2,1), P(3,1), P(4,1), P(5,1), P(0,2), P(1,2), P(2,2), P(3,2), P(4,2), P(5,2), P(6,2), P(7,2), P(8,2), P(7,3), P(8,3), and P(9,3). More specifically, the number of access cycles is equal to seventeen to draw the triangle TDEF using the interleaved pattern P of (4×4). By masking the memory banks in the interleaved pattern P which are not required to be accessed, the memory banks that are subjected to the access are those indicated by broken lines in FIG. 16.

(Interleaved pattern of 8×2)

Figure 17:
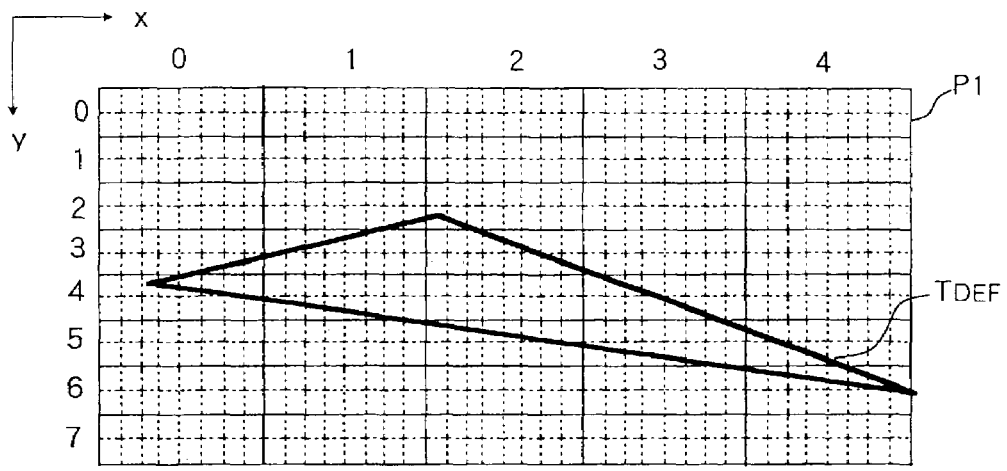
FIG. 17 is a view for explaining how access is made for the second polygon in terms of an interleaved pattern of 8×2 segments.
Figure 18:
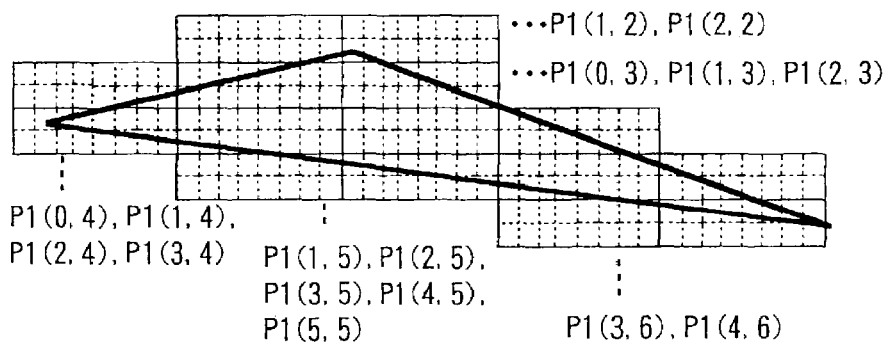
FIG. 18 is a view showing interleaved patterns used when access is made for the second polygon in terms of an interleaved pattern of 8×2 segments.
Figure 19:
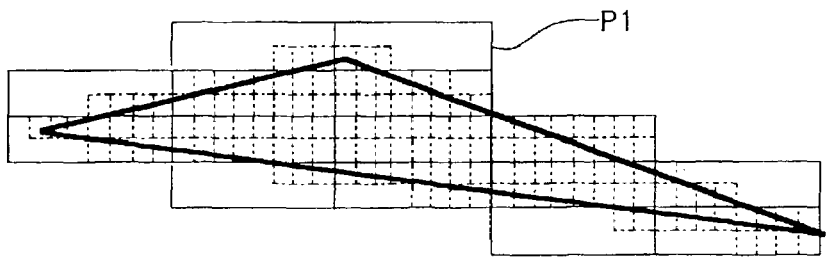
FIG. 19 is a view for explaining mask processing when access is made for the second polygon in terms of an interleaved pattern of 8×2 segments.

To access the triangle TDEF shown in FIG. 17 using the interleaved pattern P1 of (8×2), the associated segments are, as apparent from FIG. 18, the following sixteen: P1(x,y)=P1(1,2), P1(2,2), P1(0,3), P1(1,3), P1(2,3), P1(0,4), P1(1,4), P1(2,4), P1(3,4), P1(1,5), P1(2,5), P1(3,5), P1(4,5), P1(5,5), P1(3,6), and P1(4,6). More specifically, the number access cycles is equal to sixteen when the triangle TDEF is accessed using the interleaved pattern of (8×2) to access the entire area of the triangle TDEF. After masking the memory banks in this interleaved pattern P1, the memory banks subjected to the access are those indicated by broken lines in FIG. 19.

(Pattern of 16×1)

Figure 20:
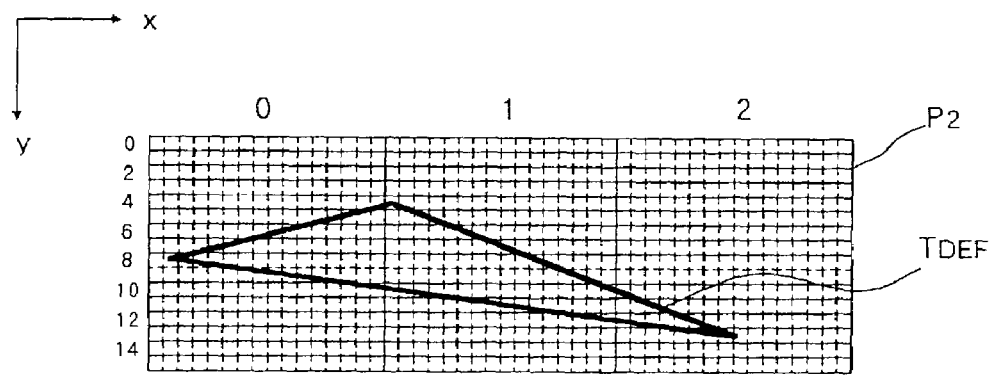
FIG. 20 is a view for explaining how access is made for the second polygon in terms of an interleaved pattern of 16×1 segments.
Figure 21:
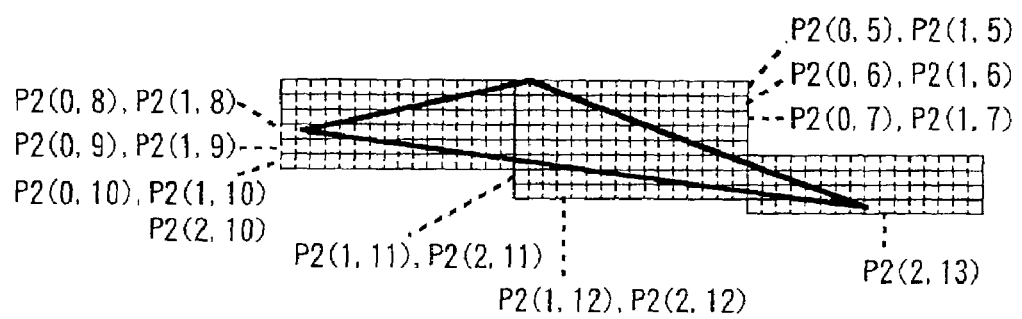
FIG. 21 is a view showing interleaved patterns used when access is made for the second polygon in terms of an interleaved pattern of 16×1 segments.
Figure 22:
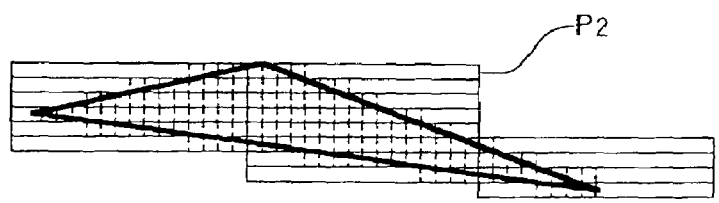
FIG. 22 is a view for explaining mask processing when access is made for the second polygon in terms of an interleaved pattern of 16×1 segments.

As shown in FIG. 20, to access the triangle TDEF using the interleaved pattern P2 of (16×1), the associated segments are, as apparent from FIG. 21, the following eighteen: P2(x,y)=P2(0,5), P2(1,5), P2(0,6), P2(1,6), P2(0,7), P2(1,7), P2(0,8), P2(1,8), P2(0,9), P2(1,9), P2(0,10), P2(1,10), P2(2,10), P2(1,11), P2(2,11), P2(1,12), P2(2,12), and P2(2,13). More specifically, to access the triangle TDEF using the interleaved pattern of (16×1), the number of access cycles is equal to eighteen to access the entire area of the triangle TDEF using the interleaved pattern P2. After masking the memory banks in this interleaved pattern P2, the memory banks subjected to the access are those indicated in FIG. 22.

As apparent from the above, the number of access cycles to access the triangle TDEF is equal to seventeen with the interleaved pattern P of (4×4). The number of access cycles to access the triangle TDEF is equal to sixteen with the interleaved pattern P1 of (8× 2). The number of access cycles to access the triangle TDEF is equal to eighteen with the interleaved pattern P2 of (16×1). This indicates that the number of the access cycles is minimum for the access of the triangle TDEF when the interleaved pattern P1 of (8×2) is used. Accordingly, the interleaved pattern P1 of (8×2) can be considered as the proper interleaved pattern for the triangle TDEF.

The control circuit 101 performs the following operations to switch the interleaved pattern to the one that is suitable for the polygon to be drawn.

Figure 23:
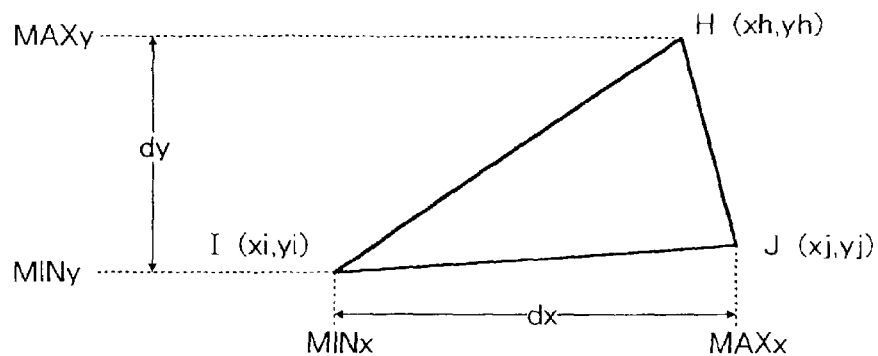
FIG. 23 is a view for explaining the calculation of an aspect ratio of a polygon to be drawn to a frame buffer.

For example, when the polygon that is to be written in the memory block [X] is a triangle (THIJ) as shown in FIG. 23, the interleave control information that is supplied from the pre-processor 32 is the information that includes x- and y-coordinates of the three vertices H, I, and J of the triangle THIJ, H(xh,yh), I(xi,yi), and J(xj,yj). The control circuit 101 uses this interleave control information to calculate the aspect ratio R of the triangle THIJ using the maximum and minimum values MAXx and MINx in the x-direction, and the maximum and minimum values MAXy and MINy in the y-direction according to the following equation:

$$R = dy/dx = (MAXy - MINy)/(MAXx - MINx).$$

In the example shown in FIG. 23, MAXx=xj, MINx=xi, MAXy=yh, and MINy=yi.

Figure 24:
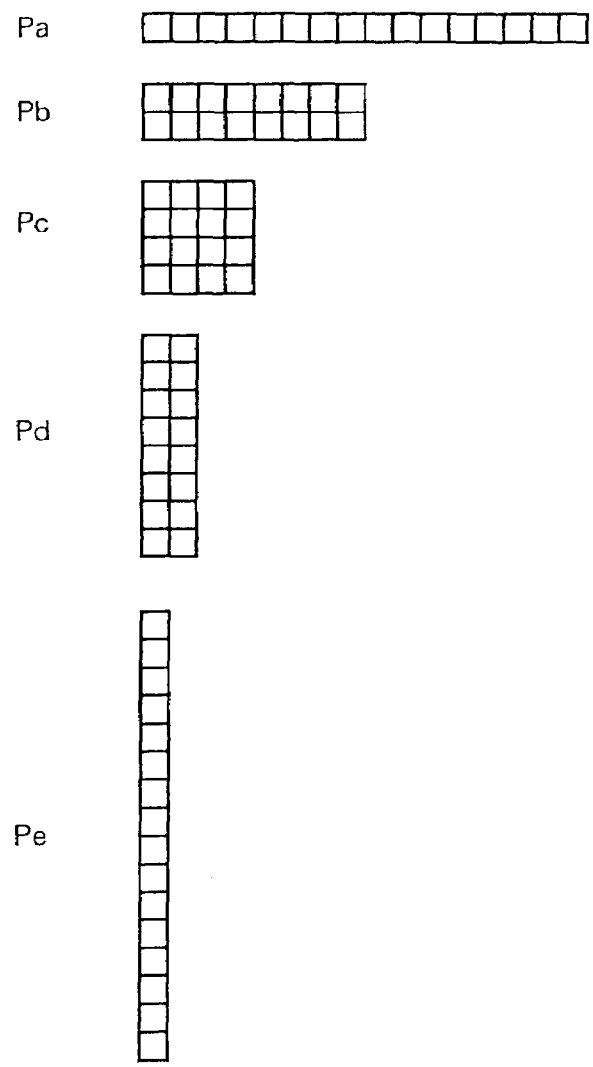
FIG. 24 is a view showing five different interleaved patterns.

The control circuit 101 selects the interleaved pattern of which aspect ratio is the closest to the aspect ratio R, as the proper interleaved pattern. The selection is made from the five interleaved patterns Pa to Pe of (1×16), (2×8), (4×4), (8×2), and (16×1) as shown in FIG. 24. The control circuit 101 then switches the interleaved pattern to be used to access the triangle THIJ to the selected interleaved pattern.

To select the optimum interleaved pattern using the aspect ratio R, the following table may be used.

TABLE 1

| ASPECT RATIO R | INTERLEAVED PATTERN |
| --- | --- |
| <0.1 | Pa (16 × 1) |
| 0.1–0.5 | Pb (8 × 2) |
| 0.5–2.0 | Pc (4 × 4) |
| 2.0–8.0 | Pd (2 × 8) |
| >8.0 | Pe (1 × 16) |

As apparent from the above, the second bus switcher 33E selects a proper interleaved pattern from the five interleaved patterns Pa to Pe as shown in FIG. 24, depending on the shape of the polygon to be drawn. The polygon can be drawn in the memory block [X] in the minimum number of access cycles because the selected interleaved pattern is used for the access to the memory block [X]. This operation provides the more efficient memory access. The GPU 15 can increase the speed at which images are drawn on the display screen because of the second bus switcher 33E having the above-mentioned features.

Figure 25A:
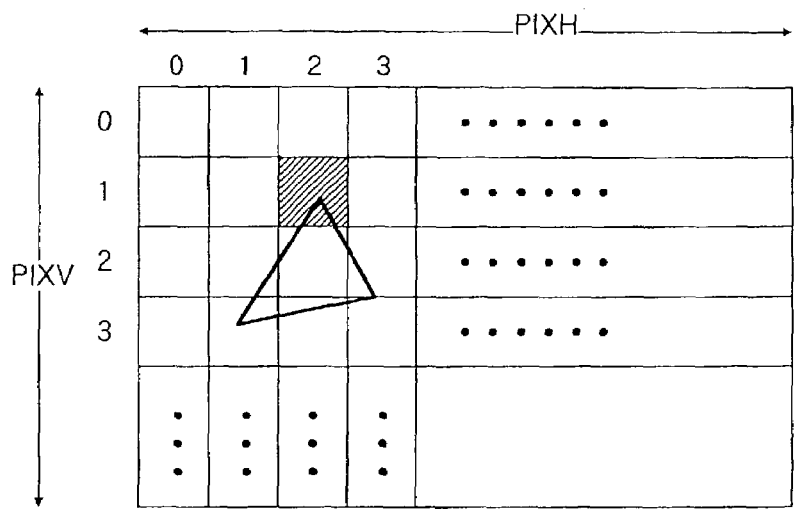
FIG. 25A is a view showing the relation between a window pane and interleaved patterns.

Next, details of the interleaving process using the selected interleaved pattern are described. FIG. 25A shows the relation between the interleaved pattern (Pc) and the display segments on the actual screen that is produced with the interleaved pattern Pc shown in FIG. 24.

Figure 25B:
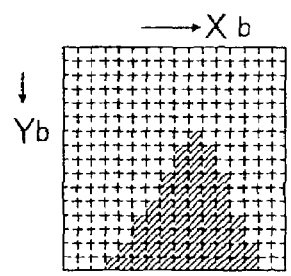
FIG. 25B is an enlarged view of a block (2,1) in FIG. 25A.

As described above in conjunction with FIG. 3, the frame buffer 18 in this embodiment has a plurality of memory blocks which correspond to the display segments of the display screen. Each memory block is specified by the addresses having the origin at the upper left corner of the display screen, that is, the x-coordinate PIXH and the y-coordinate PIXV. For example, the memory block (with diagonal lines) that is overlapped with the triangle shown in FIG. 25A has an x-coordinate of "2" and a y-coordinate of "1". Accordingly, this memory block has the address indicated by (2,1). The memory block (2,1) shown in FIG. 25A is enlarged in FIG. 25B. FIG. 25A corresponds to the upper figure in FIG. 3, and the enlarged view of the memory block shown in FIG. 25B corresponds to the lower figure in FIG. 3.

The interleaving process may be performed for each memory block. In this event, it is necessary to selectively enable the sixteen pixel engines in each memory block for each interleaved pattern to allocate the memory bank. A procedure for this purpose is described with reference to FIGS. 26 to 31.

In FIGS. 26 to 30, the number "0" indicates the pixel engine 0, the number "1" indicates the pixel engine 1, and the number "15" indicates the pixel engine 15, and so on. The information associated with the pixel engines are thus indicated.

Figure 26:
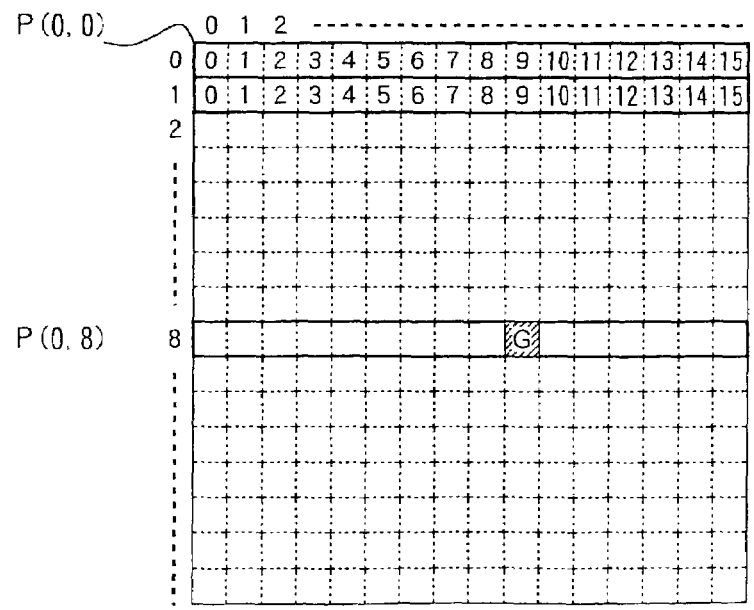
FIG. 26 is a view for explaining segments (16×1) that are accessed simultaneously when an interleaved pattern Pa is chosen.
Figures 27, 28:
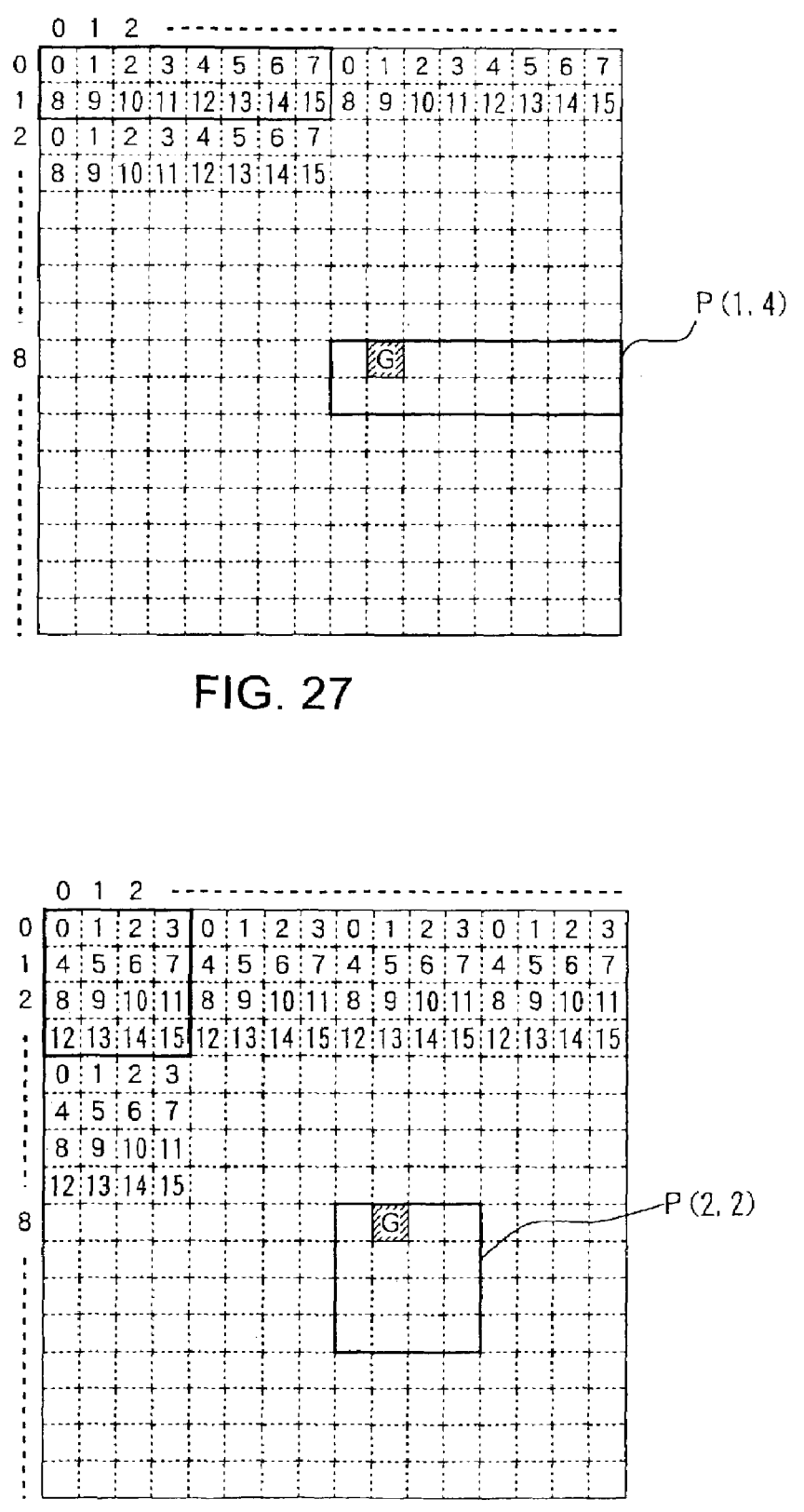
Figure 29:
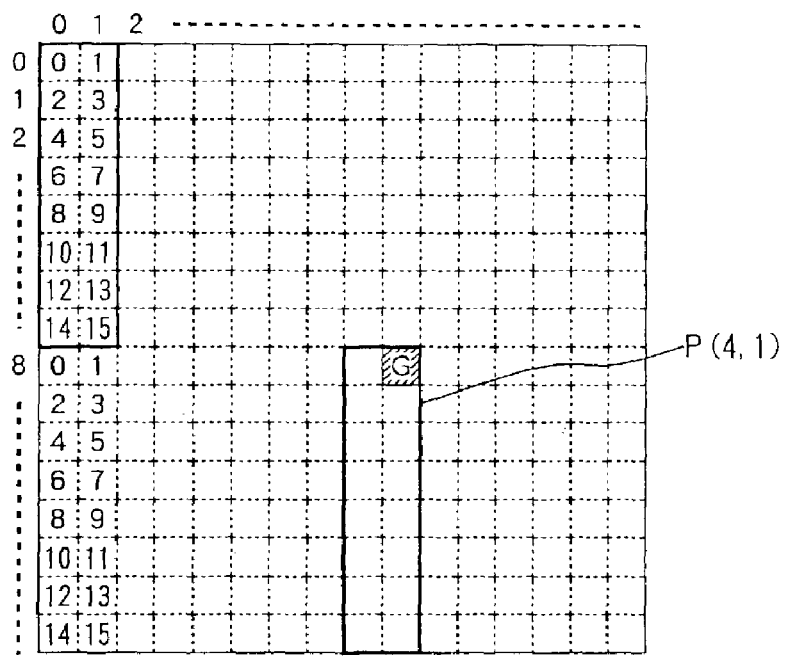
FIG. 29 is a view for explaining segments (2×8) that are accessed simultaneously when an interleaved pattern Pd is chosen.
Figure 30:
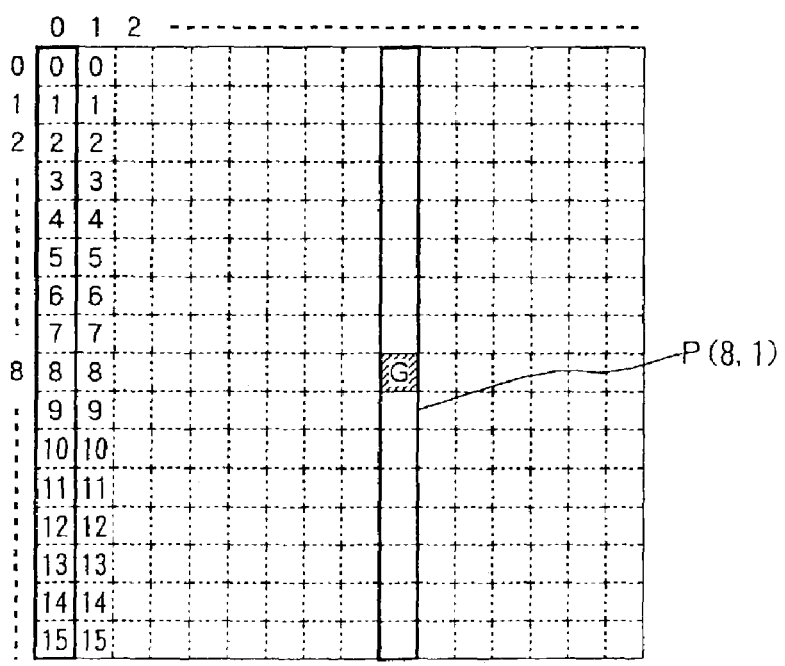
FIG. 30 is a view for explaining segments (1×16) that are accessed simultaneously when an interleaved pattern Pe is chosen.

FIGS. 26 to 30 are views showing the relation between the pixel engines and the pixels when the interleaved patterns Pa to Pe are subjected to the selection. More specifically, when the interleaved pattern Pa is selected, the enabled pixels are those in the area of 16×1 pixels that are specified by "0 to 15" as shown in FIG. 26. The sixteen pixel engines are enabled with this area used as the unit of the interleaving and are allocated with their associated memory banks.

As apparent from the above, to write sixteen pixels simultaneously to the memory block depending on the selected interleaved pattern, it is necessary to assign the sixteen pixel engines to be enabled to the different memory banks. This cannot be achieved by the conventional memory bank allocation (i.e., the one as shown in FIG. 8) because the pixels cannot be accessed at the same time using different interleaved patterns.

This embodiment determines the relation between the memory blocks and the memory banks according to a predetermined rule to provide a fast interleaving process without problems regardless of which interleaved pattern is selected. An example is shown in FIG. 31.

FIG. 31 shows an example of allocation of the memory banks that can be applied equally to any one of the interleaved patterns Pa to Pe. The numbers in the segments are identification numbers for the memory banks (1 to 15=A0 to A15). By allocating the memory banks in this manner, the memory banks are not overlapped in the single interleaved pattern regardless of which one of the interleaved patterns Pa to Pe is used.

In FIG. 31, the segments to be accessed simultaneously using the interleaved pattern Pa are indicated as a region I1. The region I1 has sixteen memory banks A0 to A15 that are arranged without being overlapped with each other. In a region I2 including the segments to be accessed simultaneously using the interleaved pattern Pb, the sixteen memory banks A0 to A15 are arranged in the region I2 without an overlap. Likewise, in regions I3 to I5 including the segments to be accessed simultaneously using the interleaved patterns Pc to Pe, respectively, the sixteen memory banks A0 to A15 are arranged without an overlap. Thus, the sixteen pixels can be accessed simultaneously even when different interleaved patterns are selected, providing an efficient interleaving process.

In this embodiment, the memory block has a capacity to allow $2^4 \times 2^4$ pixels to be written therein. The sixteen pixels are simultaneously written using a single interleaved pattern.

However, the present invention is not limited to such cases. Allocation of the memory banks for $2^m \times 2^n$ pixels is described below as an example.

The selection information A(X,Y) to enable the memory banks is given according to the following rule.

For $m \leq n$, it is expressed in the binary system, $X \bmod 2^n =$ $2^0 \times i[0] + 2^1 \times i[1] + \ldots + 2^{n-1} \times i[n-1] = \sum 2^k \times i[k](i[k]:0 \text{ or } 1)$ $Y \bmod 2^n = 2^0 \times j[0] + 2^1 \times j[1] + \ldots + 2^{n-1} \times j[n-1] =$ $\sum 2^k \times j[k](j[k]:0 \text{ or } 1)$, and then, $A(X, Y) = \sum 2^k \times (i[k] \text{ xor } j[n-1-k])$ applies, wherein i,j represents a weight of the bit, $\Sigma$ represents a sum from k=0 to k=n−1, and XOR represents the exclusive OR.

For m>n, it is expressed in the binary system, $X \bmod 2^m =$ $2^0 \times i[0] + 2^1 \times i[1] + \ldots + 2^{m-1} \times i[m-1] = \sum 2^k \times i[k](i[k]:0 \text{ or } 1)$ $Y \bmod 2^m = 2^0 \times j[0] + 2^1 \times j[1] + \ldots + 2^{m-1} \times j[m-1] =$ $\sum 2^k \times j[k](j[k]:0 \text{ or } 1)$, and then, $A(X, Y) = \sum 2^k \times (i[k] \text{ xor } j[m-1-k])$ applies, wherein i,j represents a weight of the bit, $\Sigma$ represents a sum from k=0 to k=m−1, and XOR represents the exclusive OR.

For example, the address (9,8) of the pixel G shown in FIG. 31 with diagonal lines is applied to the rule when m is equal to n, that is, "9" is substituted for "X" and "8" is substituted for "Y" and the result is expressed in the binary system, then for X=9, i(3) is equal to 1, i(2) is equal to 0, i(1) is equal to 0, and i(0) is equal to 1, and for Y=8, j(3) is equal to 1, j(2) is equal to 0, j(1) is equal to 0, and j(0) is equal to 0. Accordingly, X=1001b and Y=1000b can be given.

The numerals "1000" and "1001" are binary digits. The suffix "b" indicates that they are expressed in the binary system.

For Y=$\Sigma 2^k \times j[k]$, $\Sigma 2^k \times j[n-1-k]$ becomes an "inverse Y", so that the inverse Y can be expressed as "0001b" when Y=1000b.

Accordingly, A(9,8)=(1001b) x or (0001b)=1000b=8 holds. This coincides with the identification symbol (=8:A8) of the memory bank for the pixel G having the address A(9,8) in FIG. 31.

The above-mentioned calculation is repeated for all memory banks to determine the selection information A(X, Y). This results in the table as shown in FIG. 31. Using the table, the memory banks are allocated without an overlap in all interleaved patterns. The second bus switcher 33E is only required to determine the necessary interleaved pattern for the shape of the polygon to be drawn. Thus, the interleaving process can be performed more efficiently.

The above-mentioned mechanism increases the access speed to the memory. The frame buffer 18 is not necessarily composed of a high speed memory. The processing speed can be increased without sacrificing the costs therefor.

In this embodiment, unique and inventive interleaving process is achieved by using the second bus switcher 33E. However, another unit component or device having similar functions to that of the second bus switcher 33E may be used to achieve the present invention as in this embodiment. The interleaving process may be implemented by a combination of only hardware components, by only software processing, or by a combination of both of them.

While the above description has thus been made in conjunction with the case where the pixels are written in the memory, the present invention can also be applied to reading of the pixels only by replacing the above-mentioned pixel write-in address with the display address.

While the above description has been made in conjunction with the image processing in the entertainment device, in particular, the access to the image memory during the rendering operations, the present invention is not limited to the applications with such image memories. The present invention may be applied to any memory access operations for text data and other data.

As apparent from the above, the present invention provides the unique feature and effects of increase in access speed without using a memory that can be accessed at high speed. Therefore, the memory used is not necessarily the one that can be accessed at high speed. This provides the mechanism to increase the speed of the overall data processing while restricting unwanted escalation of price of resulting products.

What is claimed is:

1. A memory access device for accessing a memory in terms of one of different interleaved patterns, the memory having a plurality of memory segments that are arranged in the form of a matrix, comprising:

pattern selecting means for selecting an interleaved pattern to be used for access; and segment accessing means for simultaneously accessing a plurality of memory segments that are assigned thereto for the selected interleaved pattern without switching the addresses of the memory segments;

said segment accessing means being allocated with a memory segment which is not overlapped with other memory segments in the selected interleaved pattern regardless of which interleaved pattern is selected by said pattern selecting means;

wherein the memory is an image memory in which the memory segments are pixel segments, said pattern selecting means being configured to select an interleaved pattern that fits the shape of an image to be drawn to the image memory;

wherein the image memory is made up of a group of a plurality of memory blocks, each memory block having pixel segments that are to be accessed in terms of the interleaved pattern, each memory block including a number of memory banks that are to be accessed simultaneously, the memory access device being configured such that the pixel segments to be accessed are specified by a combination of a first address information and a second address information, the first address information being for identifying the memory blocks, the second address information being for identifying pixel segments in the a memory bank; and wherein each of the plurality of memory blocks is made up of $2^m$ by $2^n$ pixel segments that are arranged in the form of a matrix, the matrix having address lines divided into X row addresses and Y column addresses, the second address information being specified by A(X,Y) that is designated to access these pixel segments, the second address information A(X,Y) being given by the following equation in a binary expression when $m \leq n$ applies:

$$X \bmod 2^n = 2^0 \times i[0] + 2^1 \times i[1] + \ldots + 2^{n-1} \times i[n-1]$$
$$= \Sigma 2^k \times i[k](i[k]\text{:0 or 1})$$
$$Y \bmod 2^n = 2^0 \times j[0] + 2^1 \times j[1] + \ldots + 2^{n-1} \times j[n-1]$$
$$= \Sigma 2^k \times j[k](j[k]\text{:0 or 1})$$
$$A(X, Y) = \Sigma 2^k \times (i[k]x \text{ or } j[n-1-k])$$

wherein i,j represents a weight of the bit, $\Sigma$ represents a sum from k=0 to k=n−1, and XOR represents the exclusive OR.

2. A memory access device for accessing a memory in terms of one of different interleaved patterns, the memory having a plurality of memory segments that are arranged in the form of a matrix, comprising:

pattern selecting means for selecting an interleaved pattern to be used for access; and segment accessing means for simultaneously accessing a plurality of memory segments that are assigned thereto for the selected interleaved pattern without switching the addresses of the memory segments;

said segment accessing means being allocated with a memory segment which is not overlapped with other memory segments in the selected interleaved pattern regardless of which interleaved pattern is selected by said pattern selecting means;

wherein the memory is an image memory in which the memory segments are pixel segments, said pattern selecting means being configured to select an interleaved pattern that fits the shape of an image to be drawn to the image memory;

wherein the image memory is made up of a group of a plurality of memory blocks, each memory block having pixel segments that are to be accessed in terms of the interleaved pattern, each memory block including a number of memory banks that are to be accessed simultaneously, the memory access device being configured such that the pixel segments to be accessed are specified by a combination of a first address information and a second address information, the first address information being for identifying the memory blocks, the second address information being for identifying pixel segments in a memory bank; and wherein each of the plurality of memory blocks is made up of $2^m$ by $2^n$ pixel segments that are arranged in the form of a matrix, the matrix having address lines divided into X row addresses and Y column addresses, the second address information being specified by A(X,Y) that is designated to access these pixel segments, the second address information A(X,Y) being given by the following equation in a binary expression when m>n applies:

$$X \bmod 2^m =$$
$$2^0 \times i[0] + 2^1 \times i[1] + \ldots + 2^{m-1} \times i[m-1] = \sum 2^k \times i[k](i[k]:0 \text{ or } 1)$$

-continued
$$Y \bmod 2^m = 2^0 \times j[0] + 2^1 \times j[1] + \ldots + 2^{m-1} \times j[m-1] =$$
$$\sum 2^k \times j[k](j[k]:0 \text{ or } 1)$$
$$A(X, Y) = \sum 2^k \times (i[k] \text{ xor } j[m-1-k])$$

wherein i,j represents a weight of the bit, Σ represents a sum from k=0 to k=m−1, and XOR represents the exclusive OR.

3. A semiconductor device mounted on a computer that is adapted to access a memory, the memory having a plurality of memory segments that are arranged in the form of a matrix, the semiconductor device comprising:

means for directing the computer to establish pattern selecting means for selecting an interleaved pattern to be used for access and segment accessing means for simultaneously accessing a plurality of memory segments corresponding to the selected interleaved pattern; and means for operating the computer such that the access to the memory is made in terms of one of the different interleaved patterns without switching the addresses of the memory segments, by means of allocating, to the segment accessing means, a memory segment which is not overlapped with other memory segments in the selected interleaved pattern regardless of which interleaved pattern is selected;

wherein the memory is an image memory in which the memory segments are pixel segments, said pattern selecting means being configured to select an interleaved pattern that fits the shape of an image to be drawn to the image memory;

wherein the image memory is made up of a group of a plurality of memory blocks, each memory block having pixel segments that are to be accessed in terms of the interleaved pattern, each memory block including a number of memory banks that are to be accessed simultaneously, the semiconductor device being configured such that the pixel segments to be accessed are specified by a combination of a first address information and a second address information, the first address information being for identifying the memory blocks, the second address information being for identifying pixel segments in a memory bank; and wherein each of the plurality of memory blocks is made up of $2^m$ by $2^n$ pixel segments that are arranged in the form of a matrix, the matrix having address lines divided into X row addresses and Y column addresses, the second address information being specified by A(X,Y) that is designated to access these pixel segments, the second address information A(X,Y) being given by the following equation in a binary expression when m<n applies:

$$X \bmod 2^n = 2^0 \times i[0] + 2^1 \times i[1] + \ldots + 2^{n-1} \times i[n-1]$$
$$= \Sigma 2^k \times i[k](i[k]:0 \text{ or } 1)$$
$$Y \bmod 2^n = 2^0 \times j[0] + 2^1 \times j[1] + \ldots + 2^{n-1} \times j[n-1]$$
$$= \Sigma 2^k \times j[k](j[k]:0 \text{ or } 1)$$
$$A(X, Y) = \Sigma 2^k \times (i[k] \text{ xor } j[n-1-k])$$

wherein i,j represents a weight of the bit, Σ represents a sum from k=0 to k=n−1, and XOR represents the exclusive OR.

4. A method for controlling access to a memory performed by a computer, the access being made in terms of one of different interleaved patterns, the memory having a plurality of memory segments that are arranged in the form of a matrix, the method comprising the steps of:

specifying a plurality of memory segments to which access can be made simultaneously, such that the same memory segments are not overlapped in the interleaved pattern regardless of which interleaved pattern is selected;

selecting the interleaved pattern to be used for the access; and accessing simultaneously the plurality of memory segments that are allocated for the selected interleaved pattern, without switching the addresses of the memory segments;

wherein the memory is an image memory in which the memory segments are pixel segments, and the selected interleaved pattern fits the shape of an image to be drawn to the image memory;

wherein the image memory is made up of a group of a plurality of memory blocks, each memory block having pixel segments that are to be accessed in terms of the interleaved pattern, each memory block including a number of memory banks that are to be accessed simultaneously, the pixel segments to be accessed being specified by a combination of a first address information and a second address information, the first address information being for identifying the memory blocks, the second address information being for identifying pixel segments in a memory bank; and wherein each of the plurality of memory blocks is made up of $2^m$ by $2^n$ pixel segments that are arranged in the form of a matrix, the matrix having address lines divided into X row addresses and Y column addresses, the second address information being specified by A(X,Y) that is designated to access these pixel segments, the second address information A(X,Y) being given by the following equation in a binary expression when m<n applies:

$$X \bmod 2^n = 2^0 \times i[0] + 2^1 \times i[1] + \ldots + 2^{n-1} \times i[n-1]$$
$$= \Sigma 2^k \times i[k](i[k]:0 \text{ or } 1)$$
$$Y \bmod 2^n = 2^0 \times j[0] + 2^1 \times j[1] + \ldots + 2^{n-1} \times j[n-1]$$
$$= \Sigma 2^k \times j[k](j[k]:0 \text{ or } 1)$$
$$A(X, Y) = \Sigma 2^k \times (i[k] \text{ xor } j[n-1-k])$$

wherein i,j represents a weight of the bit, Σ represents a sum from k=0 to k=n−1, and XOR represents the exclusive OR.

5. A computer program stored in a tangible medium, for accessing a memory having a plurality of memory segments that are arranged in the form of a matrix, the computer program comprising executable instructions that cause a computer to:

specify a plurality of memory segments to which access can be made simultaneously, such that the same memory segments are not overlapped in the interleaved pattern regardless of which interleaved pattern is selected;

select an interleaved pattern to be used for access; and
simultaneously access a plurality of memory segments that are assigned thereto for the selected interleaved pattern, without switching the addresses of the memory segments;
wherein the memory is an image memory in which the memory segments are pixel segments, said pattern selecting means being configured to select an interleaved pattern that fits the shape of an image to be drawn to the image memory;
wherein the image memory is made up of a group of a plurality of memory blocks, each memory block having pixel segments that are to be accessed in terms of the interleaved pattern, each memory block including a number of memory banks that are to be accessed simultaneously, the pixel segments to be accessed being specified by a combination of a first address information and a second address information, the first address information being for identifying the memory blocks, the second address information being for identifying pixel segments in a memory bank; and
wherein each of the plurality of memory blocks is made up $2^m$ by $2^n$ pixel segments that are arranged in the form of a matrix, the matrix having address lines divided into X row addresses and Y column addresses, the second address information being specified by A(X,Y) that is designated to access these pixel segments, the second address information A(X,Y) being given by the following equation in a binary expression when m<n applies:

$$X \bmod 2^n = 2^0 \times i[0] + 2^1 \times i[1] + \ldots + 2^{n-1} \times i[n-1]$$
$$= \Sigma 2^k \times i[k](i[k]\!:\!0 \text{ or } 1)$$
$$Y \bmod 2^n = 2^0 \times j[0] + 2^1 \times j[1] + \ldots + 2^{n-1} \times j[n-1]$$
$$= \Sigma 2^k \times j[k](j[k]\!:\!0 \text{ or } 1)$$
$$A(X, Y) = \Sigma 2^k \times (i[k] \, xor \, j[n-1-k])$$

wherein i,j represents a weight of the bit, Σ represents a sum from k=0 to k=n−1, and XOR represents the exclusive OR.

6. A semiconductor device mounted on a computer that is adapted to access a memory, the memory having a plurality of memory segments that are arranged in the form of a matrix, the semiconductor device comprising:
means for directing the computer to establish pattern selecting means for selecting an interleaved pattern to be used for access and segment accessing means for simultaneously accessing a plurality of memory segments corresponding to the selected interleaved pattern; and
means for operating the computer such that the access to the memory is made in terms of one of the different interleaved patterns without switching the addresses of the memory segments, by means of allocating, to the segment accessing means, a memory segment which is not overlapped with other memory segments in the selected interleaved pattern regardless of which interleaved pattern is selected;
wherein the memory is an image memory in which the memory segments are pixel segments, said pattern selecting means being configured to select an interleaved pattern that fits the shape of an image to be drawn to the image memory;
wherein the image memory is made up of a group of a plurality of memory blocks, each memory block having pixel segments that are to be accessed in terms of the interleaved pattern, each memory block including a number of memory banks that are to be accessed simultaneously, the semiconductor device being configured such that the pixel segments to be accessed are specified by a combination of a first address information and a second address information, the first address information being for identifying the memory blocks, the second address information being for identifying pixel segments in a memory bank; and
wherein each of the plurality of memory blocks is made up of $2^m$ by $2^m$ pixel segments that are arranged in the form of a matrix, the matrix having address lines divided into X row addresses and Y column addresses, the second address information being specified by A(X,Y) that is designated to access these pixel segments, the second address information A(X,Y) being given by the following equation in a binary expression when m>n applies:

$$X \bmod 2^m =$$
$$2^0 \times i[0] + 2^1 \times i[1] + \ldots + 2^{m-1} \times i[m-1] = \sum 2^k \times i[k](i[k]\!:\!0 \text{ or } 1)$$
$$Y \bmod 2^m = 2^0 \times j[0] + 2^1 \times j[1] + \ldots + 2^{m-1} \times j[m-1] =$$
$$\sum 2^k \times j[k](j[k]\!:\!0 \text{ or } 1)$$
$$A(X, Y) = \sum 2^k \times (i[k] \, xor \, j[m-1-k])$$

wherein i,j represents a weight of the bit, Σ represents a sum from k=0 to k=m−1, and XOR represents the exclusive OR.

7. A method for controlling access to a memory performed by a computer, the access being made in terms of one of different interleaved patterns, the memory having a plurality of memory segments that are arranged in the form of a matrix, the method comprising the steps of:
specifying a plurality of memory segments to which access can be made simultaneously, such that the same memory segments are not overlapped in the interleaved pattern regardless of which interleaved pattern is selected;
selecting the interleaved pattern to be used for the access; and
accessing simultaneously the plurality of memory segments that are allocated for the selected interleaved pattern, without switching the addresses of the memory segments;
wherein the memory is an image memory in which the memory segments are pixel segments, and the selected interleaved pattern fits the shape of an image to be drawn to the image memory;
wherein the image memory is made up of a group of a plurality of memory blocks, each memory block having pixel segments that are to be accessed in terms of the interleaved pattern, each memory block including a number of memory banks that are to be accessed simultaneously, the pixel segments to be accessed being specified by a combination of a first address information and a second address information, the first address information being for identifying the memory blocks, the second address information being for identifying pixel segments in a memory bank; and wherein each of the plurality of memory blocks is made up of $2^m$ by $2^n$ pixel segments that are arranged in the form of a matrix, the matrix having address lines divided into X row addresses and Y column addresses, the second address information being specified by A(X,Y) that is designated to access these pixel segments, the second address information A(X,Y) being given by the following equation in a binary expression when m>n applies:

$$X \bmod 2^m = $$
$$2^0 \times i[0] + 2^1 \times i[1] + \ldots + 2^{m-1} \times i[m-1] = \sum 2^k \times i[k] (i[k]:0 \text{ or } 1)$$
$$Y \bmod 2^m = 2^0 \times j[0] + 2^1 \times j[1] + \ldots + 2^{m-1} \times j[m-1] = $$
$$\sum 2^k \times j[k] (j[k]:0 \text{ or } 1)$$
$$A(X, Y) = \sum 2^k \times (i[k] \text{ xor } j[m-1-k])$$

wherein i,j represents a weight of the bit, $\Sigma$ represents a sum from k=0 to k=m−1, and XOR represents the exclusive OR.

8. A computer program stored in a tangible medium, for accessing a memory having a plurality of memory segments that are arranged in the form of a matrix, the computer program comprising executable instructions that cause a computer to:

specify a plurality of memory segments to which access can be made simultaneously, such that the same memory segments are not overlapped in the interleaved pattern regardless of which interleaved pattern is selected;

select an interleaved pattern to be used for access; and simultaneously access a plurality of memory segments that are assigned thereto for the selected interleaved pattern, without switching the addresses of the memory segments;

wherein the memory is an image memory in which the memory segments are pixel segments, said pattern selecting means being configured to select an interleaved pattern that fits the shape of an image to be drawn to the image memory;

wherein the image memory is made up of a group of a plurality of memory blocks, each memory block having pixel segments that are to be accessed in terms of the interleaved pattern, each memory block including a number of memory banks that are to be accessed simultaneously, the pixel segments to be accessed being specified by a combination of a first address information and a second address information, the first address information being for identifying the memory blocks, the second address information being for identifying pixel segments in a memory bank; and wherein each of the plurality of memory blocks is made up of $2^m$ by $2^n$ pixel segments that are arranged in the form of a matrix, the matrix having address lines divided into X row addresses and Y column addresses, the second address information being specified by A(X,Y) that is designated to access these pixel segments, the second address information A(X,Y) being given by the following equation in a binary expression when m>n applies:

$$X \bmod 2^m = $$
$$2^0 \times i[0] + 2^1 \times i[1] + \ldots + 2^{m-1} \times i[m-1] = \sum 2^k \times i[k] (i[k]:0 \text{ or } 1)$$
$$Y \bmod 2^m = 2^0 \times j[0] + 2^1 \times j[1] + \ldots + 2^{m-1} \times j[m-1] = $$
$$\sum 2^k \times j[k] (j[k]:0 \text{ or } 1)$$
$$A(X, Y) = \sum 2^k \times (i[k] \text{ xor } j[m-1-k])$$

wherein i,j represents a weight of the bit, $\Sigma$ represents a sum from k=0 to k=m−1, and XOR represents the exclusive OR.

* * * * *